US 9,317,485 B2

(12) United States Patent
Dent et al.

(10) Patent No.: US 9,317,485 B2
(45) Date of Patent: Apr. 19, 2016

(54) SELECTIVE RENDERING OF ELECTRONIC MESSAGES BY AN ELECTRONIC DEVICE

(75) Inventors: Terrill Mark Dent, Waterloo (CA); Ryan Gregory Wood, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 484 days.

(21) Appl. No.: 13/475,326

(22) Filed: May 18, 2012

(65) Prior Publication Data

US 2013/0179771 A1 Jul. 11, 2013

Related U.S. Application Data

(60) Provisional application No. 61/584,359, filed on Jan. 9, 2012.

(51) Int. Cl.
*G06F 17/21* (2006.01)
*G06Q 10/10* (2012.01)

(52) U.S. Cl.
CPC ............ *G06F 17/211* (2013.01); *G06Q 10/107* (2013.01)

(58) Field of Classification Search
USPC .......................................... 715/238, 252, 269
See application file for complete search history.

(56) References Cited

U.S. PATENT DOCUMENTS

| | | | |
|---|---|---|---|
| 6,081,831 A | 6/2000 | Miura | |
| 6,161,130 A * | 12/2000 | Horvitz et al. | 709/206 |
| 6,665,842 B2 | 12/2003 | Nielsen | |
| 6,708,189 B1 | 3/2004 | Fitzsimons et al. | |
| 6,779,178 B1 * | 8/2004 | Lloyd et al. | 717/174 |
| 7,356,572 B2 | 4/2008 | Jiang et al. | |
| 7,461,332 B2 | 12/2008 | Brintzenhofe et al. | |
| 7,516,402 B2 | 4/2009 | Koivisto et al. | |
| 7,640,498 B2 | 12/2009 | Koechley et al. | |
| 8,020,089 B1 * | 9/2011 | Brichford et al. | 715/234 |
| 8,341,529 B1 * | 12/2012 | Li et al. | 715/741 |
| 8,453,051 B1 * | 5/2013 | Weiss et al. | 715/240 |
| 8,542,823 B1 * | 9/2013 | Nguyen et al. | 380/42 |
| 2001/0011364 A1 * | 8/2001 | Stoub | 717/1 |
| 2004/0003283 A1 * | 1/2004 | Goodman et al. | 713/201 |

(Continued)

FOREIGN PATENT DOCUMENTS

| | | |
|---|---|---|
| EP | 1647906 A2 | 4/2006 |
| WO | 0245374 A2 | 6/2002 |
| WO | 2006111831 A1 | 10/2006 |

OTHER PUBLICATIONS

Microsoft Computer Dictionary; May 1, 2002; Microsoft Press; Fifth Edition; pp. 279 and 516.*

(Continued)

*Primary Examiner* — Andrew Dyer
(74) *Attorney, Agent, or Firm* — Rowand LLP

(57) ABSTRACT

An electronic device or system and method are provided for selectively normalizing or modifying content element attributes that are defined using absolute values, such as absolute font sizes expressed in length measurements such as points and pixels. A document containing structured content, such as an HTML-formatted email message or webpage, is obtained. When any such content element attributes are included with the document, a determination is made whether those attributes can be changed for that document. The determination may be dependent on the complexity of the structured document. If so, the absolute values are converted to relative values, and the document is subsequently rendered for display.

17 Claims, 10 Drawing Sheets

(56) References Cited

U.S. PATENT DOCUMENTS

| | | | |
|---|---|---|---|
| 2004/0006747 A1* | 1/2004 | Tyler | 715/530 |
| 2004/0148571 A1 | 7/2004 | Lue | |
| 2004/0183817 A1 | 9/2004 | Kaasila | |
| 2005/0134693 A1* | 6/2005 | Torimoto et al. | 348/207.99 |
| 2005/0160065 A1* | 7/2005 | Seeman | 707/1 |
| 2005/0162446 A1 | 7/2005 | Worrell | |
| 2007/0239704 A1 | 10/2007 | Burns et al. | |
| 2007/0250770 A1* | 10/2007 | Gu et al. | 715/542 |
| 2008/0062438 A1* | 3/2008 | Lin et al. | 358/1.2 |
| 2008/0178073 A1 | 7/2008 | Gao et al. | |
| 2008/0266298 A1* | 10/2008 | Hess | G01C 21/3673 345/467 |
| 2008/0307301 A1* | 12/2008 | Decker | G06F 17/30905 715/241 |
| 2009/0044013 A1* | 2/2009 | Zhu et al. | 713/170 |
| 2009/0287470 A1 | 11/2009 | Farnsworth et al. | |
| 2010/0011076 A1* | 1/2010 | Shkolnikov et al. | 709/206 |
| 2010/0265256 A1* | 10/2010 | Abe et al. | 345/467 |
| 2010/0293452 A1* | 11/2010 | Suzuki | G06F 17/2247 715/234 |
| 2010/0299395 A1* | 11/2010 | Klassen | 709/206 |
| 2011/0191433 A1 | 8/2011 | Du | |
| 2011/0202829 A1 | 8/2011 | Klassen et al. | |
| 2011/0258535 A1* | 10/2011 | Adler et al. | 715/235 |
| 2011/0302510 A1* | 12/2011 | Harrison | G06F 17/2247 715/760 |
| 2012/0005282 A1* | 1/2012 | Steinbok et al. | 709/206 |
| 2012/0042018 A1* | 2/2012 | Singh et al. | 709/206 |
| 2012/0172088 A1* | 7/2012 | Kirch et al. | 455/557 |

OTHER PUBLICATIONS

Craig Zacker; 10 Minute Guide to HTML Style Sheets; Feb. 1997; Que Corporation; pp. 1-6.*

Arc90 Inc.: "arc90labs—readability", 2010, http://code.google.com/p/arc90labs-readability/source/browse/trunk/js/readability.js, accessed Feb. 21, 2012, pp. 1-19.

Parker, C.: "A Soft Landing to ODS 9.1", retrieved from the Internet, URL: [http://support.sas.com/rnd/base/ods/templateFAQ/ODS91.pdf], SAS 2008, pp. 1-21.

Extended European Search Report dated May 6, 2013 from EP12168544.0.

Artail, H. A. et al: "Device-aware desktop web page transformation for rendering on handhelds", Personal and Ubiquitous Computing, Springer Verlag. Lo. vol. 9, No. 6., Dec. 1, 2005, pp. 368-380. XP019381451, ISSN: 1617-4917. DOI: 10.1007/S00779-005-0348-5.

Bickmore, T. et al: "Web Page Filtering and 1.15 Re-authoring for Mobile Users", Computer Journal. Oxford University Press, Surrey. GB., vol. 42. No. 6, Jan. 1, 1999, pp. 534-546. XP000920338, ISSN: 0010-4620, DOI: 10.1093/COMJNL/42.6.534.

* cited by examiner

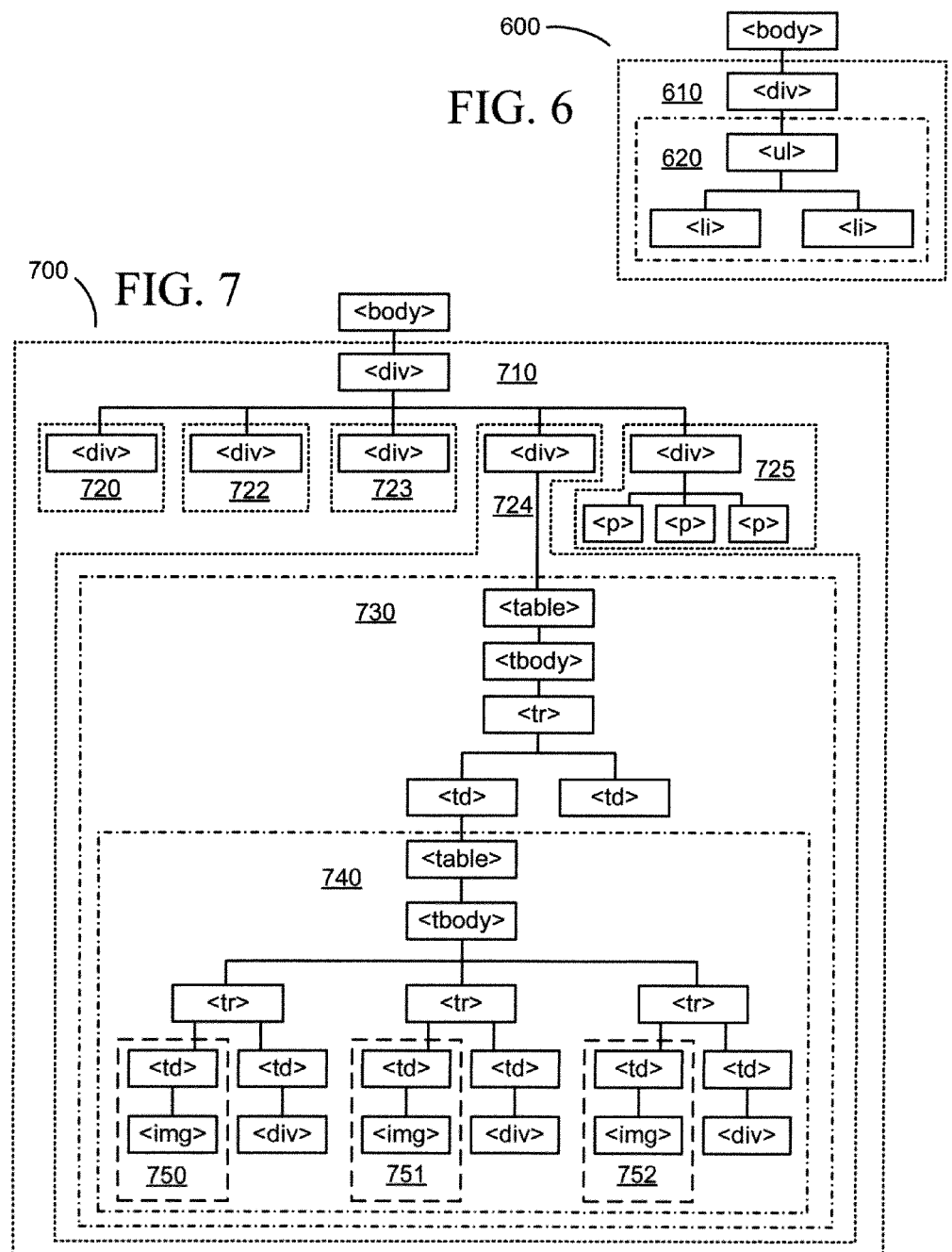

SELECTIVE RENDERING OF ELECTRONIC MESSAGES BY AN ELECTRONIC DEVICE

CROSS-REFERENCE TO RELATED APPLICATIONS

This application claims priority from U.S. Provisional Application Ser. No. 61/584,359 filed 9 Jan. 2012, the entirety of which is incorporated herein by reference.

TECHNICAL FIELD

The present disclosure relates to processing and rendering for display of electronic messages including presentational formatting.

TECHNICAL BACKGROUND

The visual appearance of electronic messages, including email and other suitable text-based messaging media, can be enhanced through the application of presentational formatting instructions (e.g., specifying font face, size, color, indentation, bulleted and ordered lists, and the like). Formatting of this nature is typically specified by the message author using a messaging client, such as an email client application, or using another application for authoring the message content, such as a word processor or text editor. The formatting instructions are included with the message content and transmitted to the recipient.

When the message is received by the recipient's device, the recipient's messaging client parses the formatting instructions included in the message that it supports, and applies them to the message content when it is rendered for display. The appearance of the message when displayed can be affected by a number of factors, including the availability of specified fonts at the displaying device, inherent limitations of the message rendering module at the device, overriding settings of the recipient messaging client, and the display screen size and resolution (e.g., pixels per inch). The display screen size may range from a large desktop monitor to a small cellphone screen; the resolution of an electronic device display can also vary from device to device, even those with similarly-sized screens. Thus, for example, despite the declaration of a specific font size in the formatting instructions, the actual physical size of the displayed message text may vary significantly from the physical size displayed while the message was being authored.

BRIEF DESCRIPTION OF THE DRAWINGS

In drawings which illustrate by way of example only embodiments of the present disclosure, in which like reference numerals describe similar items throughout the various figures.

FIG. 6 is a schematic diagram illustrating a render tree hierarchy for the message depicted in FIG. 4.

FIG. 7 is a schematic diagram illustrating a render tree hierarchy for the message depicted in FIG. 5.

DETAILED DESCRIPTION OF THE INVENTION

Figure 1:
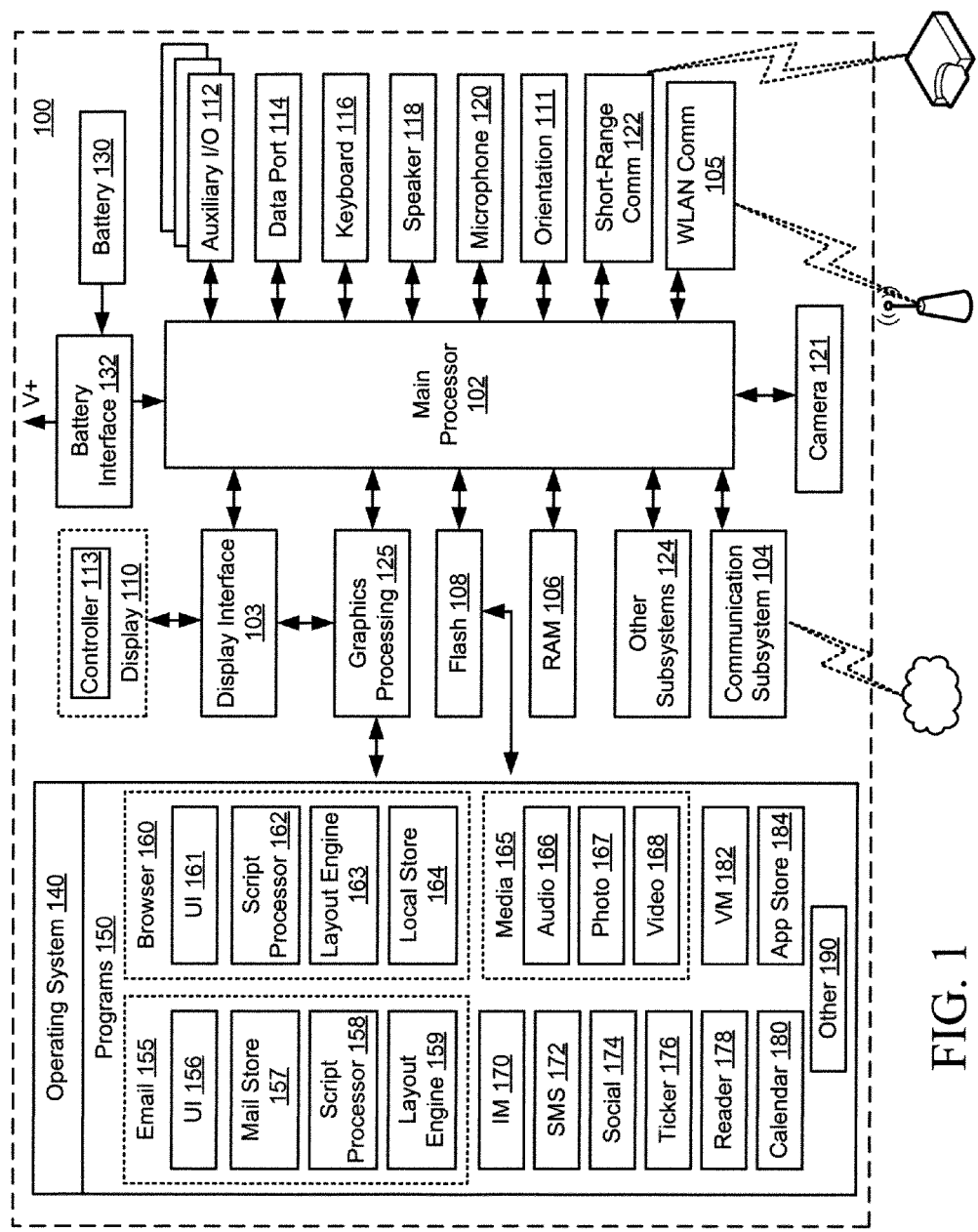
FIG. 1 is a block diagram of an example of an electronic device.

The embodiments described herein provide a device, system and method for selectively processing a document for display by normalizing selected attributes of the document prior to rendering the document and painting it to a display screen. In particular, the document may be an email or other electronic message containing formatted content elements having formatting directives (e.g. declarations) associated with those content elements. These embodiments include a method implemented at an electronic device, the method comprising: obtaining a document including a content element having an attribute, the attribute being defined by an associated formatting directive comprising an absolute value referencing a physical characteristic of a display screen; determining that the attribute can be changed for that document; altering the formatting directive to refer to a relative value corresponding to the absolute value, the relative value referencing a base value for the attribute; and rendering the document for display using the formatting directive thus altered.

These embodiments will be described and illustrated primarily in relation to electronic devices, such as tablet computers, smartphones, or any other portable electronic device, which may or may not be equipped to communicate over wireless networks or public networks. It will be appreciated by those skilled in the art, however, that this description is not intended to limit the scope of the described embodiments to implementation on these particular systems. For example, the methods and systems described herein may be applied to any appropriate communication device or data processing device adapted to process input files for display and to send the processed data for display to a display interface, whether or not the device is adapted to communicate with another communication or data processing device using a network communication interface adapted to communicate over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on electronic devices adapted for communication or messaging, including without limitation cellular phones, smartphones, wireless organizers, personal digital assistants, desktop computers, terminals, laptops, tablets, handheld wireless communication devices, notebook computers, portable gaming devices, Internet-connected televisions, set-top boxes, digital picture frames, digital cameras, in-vehicle entertainment systems, entertainment devices such as MP3 or video players, and the like. Unless expressly stated, an electronic device may include any such device or any device capable of receiving or retrieving a structured document such as a webpage and causing information therefrom to be displayed. As contemplated herein, the electronic device may have an integrated display interface, or may be configured to output data to be painted to an external display unit such as an external monitor or panel, television screen, projector, or virtual retinal display (via a data port or transmitter, such as a BLUETOOTH® transceiver, USB port, HDMI port, DVI port, and the like). References herein to a "display," "display screen" or "display interface" are intended to encompass both integrated and external display units.

FIG. 1 is a block diagram of an example of an electronic device 100 that may be used with the embodiments described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

The electronic device 100 may be a battery-powered device including a battery interface 132 for receiving one or more rechargeable batteries 130. Communication functions, including data and voice communications, are performed through one or more communication subsystems 104, 105, and/or 122 in communication with the processor 102. Data received by the electronic device 100 can be decompressed and decrypted by a decoder, operating according to any suitable decompression techniques, and encryption/decryption techniques according to one or more various encryption or compression standards known to persons of skill in the art.

If equipped with a communication subsystem 104, this subsystem 104 receives data from and sends data to wireless network 200. In this example of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the examples described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network 200, over varying distances that may be less than the distance over which the communication subsystem 104 can communicate with the wireless network 200. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem provided in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems, if present, such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, a camera 121, the communications 104, 105, 122 and other device subsystems 124. The auxiliary subsystem 112 can include devices such as a mouse, trackball, infrared fingerprint detector, or a roller wheel with dynamic button pressing capability, optical joystick, trackpad, or other user input device. The electronic device may also be provided with an orientation sensor or module 111, used to detect the orientation of the display 110. In the case of a portable (such as a handheld) electronic device 100, display 110 is typically integrated with the device 100, as well as the orientation module 111. In the case of an electronic device 100 where the display 110 is external to the device, the orientation module 111 may be integrated with the external display screen. The orientation module 111 may include any suitable module that may be selected by those skilled in the art, such as an accelerometer which may be used to detect gravity- or motion-induced forces and their direction. For example, the orientation module can have a digital three-axis accelerometer connected to an interrupt and serial interface of the processor 102, or another microcontroller of the device 100 (not shown). The processor 102 or microcontroller determines the device 100 orientation in accordance with acceleration measured by the accelerometer and provides the detected orientation to the operating system, or raw acceleration data measured by the accelerometer can be sent to the processor 102 so that device orientation is determined by the operating system of the electronic device 100. The orientation module 111 may thus be considered to include the accelerometer, microcontroller or those modules of the processor 102 executing to determine orientation. It should be understood that the orientation module 111 may optionally be present at an external display, and provide orientation determination for the display screen associated with the electronic device 100. Whether the orientation module 111 is located at an external display or is located at the electronic device 100 having an integrated display, the orientation determined by the orientation module 111 is related to the orientation of the display screen associated with the mobile device.

The orientation or acceleration detected at the electronic device 100 (or at the external display 110) may be processed to determine a response of the electronic device 100, such as an orientation of a graphical user interface displayed on the display 110 in response to a determination of the current orientation detected. Upon determination of the current orientation or a change in orientation, the operating system may issue notifications to executing applications of the current orientation. Individual applications may register a device orientation event notification listener with the operating system to receive such notifications. Alternatively, applications may query the operating system for the current orientation at defined intervals.

In some embodiments, the electronic device 100 may be a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the electronic device 100, although in some embodiments, additional buttons, variously shown in the figures or a trackpad, or other input means may be provided. If a touchscreen display interface 110 is provided, then other user input means such as the keyboard 116 may or may not be present. The controller 113 and/or the processor 102 may detect a touch by any suitable contact member on the touch-sensitive display 110.

A visualization processor or module 125 may be included in the electronic device 100. The visualization module 125 analyzes and processes data for visualization on the display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. In some electronic devices 100, particularly those provided with integrated displays 100 (although as noted above, the embodiments herein are not necessarily restricted to only such devices), the processor 102, visualization module 125, and other components are configured to respond to detected changes in orientation of the device 100.

The electronic device 100 also includes an operating system 140 and software components 155 to 190, collectively indicated as programs 150 in FIG. 1. The operating system 140 and the software components 155 to 190 that are executed by the main processor 102 are typically stored in a persistent store such as the flash memory 108, which can alternatively be a read-only memory (ROM) or similar storage element (not shown). Those skilled in the art will appreciate that portions of the operating system 140 and the software components 155 to 184, such as specific device applications, or parts thereof, can be temporarily loaded into a volatile store such as the RAM 106. Other software components 190 besides those explicitly illustrated in FIG. 1 can also be included, as is well known to those skilled in the art.

Software applications may be installed on the electronic device 100 during its manufacture (for example, during initial loading of the operating system 140), or at a subsequent time once the electronic device 100 is delivered to the user. These software applications may be supplied by the electronic device manufacturer or operating system provider, or may be third party applications. The additional applications can be loaded onto the electronic device 100 through at least one of the communications subsystems 104, 105, 122, the auxiliary I/O subsystem 112, the data port 114, or any other suitable device subsystem 124. This flexibility in application installation increases the functionality of the electronic device 100 and can provide enhanced on-device functions, communication-related functions, or both.

The various applications that may be installed on the electronic device 100 include messaging applications, such as the email messaging application 155, instant messaging (IM) application 170, and short message service (SMS) service 172. Various alternatives exist for message applications, as is well known to those skilled in the art. Messages that have been sent or received by the user are typically stored in the flash memory 108 of the electronic device 100 or some other suitable storage element in the electronic device 100. Each message type may have a distinct message store in the device memory. In at least some examples, some of the sent and received messages can be stored remotely from the device 100 such as in a data store of an associated host system with which the electronic device 100 communicates. There may be multiple ones of these applications installed on the electronic device 100; for example, a distinct application may be used for each different account provisioned on the electronic device 100, even if the message types associated with those accounts are the same. Other types of messaging applications may be included on the electronic device 100, and other ones of the depicted applications may also provide access to a form of messaging service, such as social networking applications 172. Social networking applications and others are generally configured to receive or retrieve data over a network for presentation to the user, such as the browser application 160, ticker application 176, and reader application 178. The browser application 160 may also be used to access a message service provided over the network.

Other types of software applications can also be installed on the electronic device 100, such as calendar applications 180, media applications 165 for processing and presenting audio files 166, photos and other graphic files 167, and videos 168. One or more virtual machines 182 may be provided on the electronic device 100 for executing applications requiring a runtime environment other than that provided by the operating system 140. A further application 184 may provide access over a network to a vendor site offering software applications for download (and optionally for purchase) to the electronic device 100.

In use, a received signal such as a text message, an email message, or webpage download will be processed by the receiving communication subsystem 104, 105, 122 and input to the main processor 102. The main processor 102 will then process the received signal for output to the display 110 or alternatively to the auxiliary I/O subsystem 112. A subscriber can also compose data items, such as email messages, for transmission over a network.

The communication subsystems 104, 105, 122 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 104, 105, 122, or other communication subsystem is dependent upon the communication network with which the electronic device 100 is intended to operate. Thus, it should be understood that the foregoing description serves only as one example.

Text-based content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, or other suitable application, can process and render the document for display in accordance with any formatting or stylistic directives included with the document. FIG. 1 also illustrates possible principal components of the email messaging application 155 and browser application 160. The email message application may include a user interface module 156 for rendering user interface elements for use in display screens of the messaging application; a mail store 157 (this is considered to form part of the application 155 to the extent that it interoperates with the various application components, although in practice the mail store 157 may be located in memory 108 in the device 100 in a location distinct from the messaging application code itself); a script processor, plug-in, or virtual machine 158 for executing code snippets, scripts and the like embedded in, received with, or invoked by the message being processed by the application; and a layout engine 159 for generating a rendered version of email messages for output to the display 110.

The browser application 160 includes a user interface engine 161, layout or rendering engine 163, a script processor, plug-in, or virtual machine 162 for executing code snippets, scripts and the like embedded in, received with, or invoked by the webpage being processed. The browser application 160 may also have its own local store 164, allocated to the application from the volatile and/or non-volatile memory 106, 108 of the electronic device 100. In some cases, messaging applications such as the email messaging application 155 are not provided with their own script processors 158 and/or layout engines 159; instead, the processing and layout functionality of the analogous components of the browser application 160 are used. This is particularly the case where the email messaging application 155 and the browser application 160 are provided by the same developer or publisher.

When a document such as a message or webpage is received or retrieved for processing and display, it is processed by the appropriate layout engine, with any scripts embedded in or provided with the document passed to the script processor for execution. The layout engine parses the document to generate a rendered version for output at the display 110. The rendered output may be provided to the visualization module and thence to the display 110.

Figure 2:
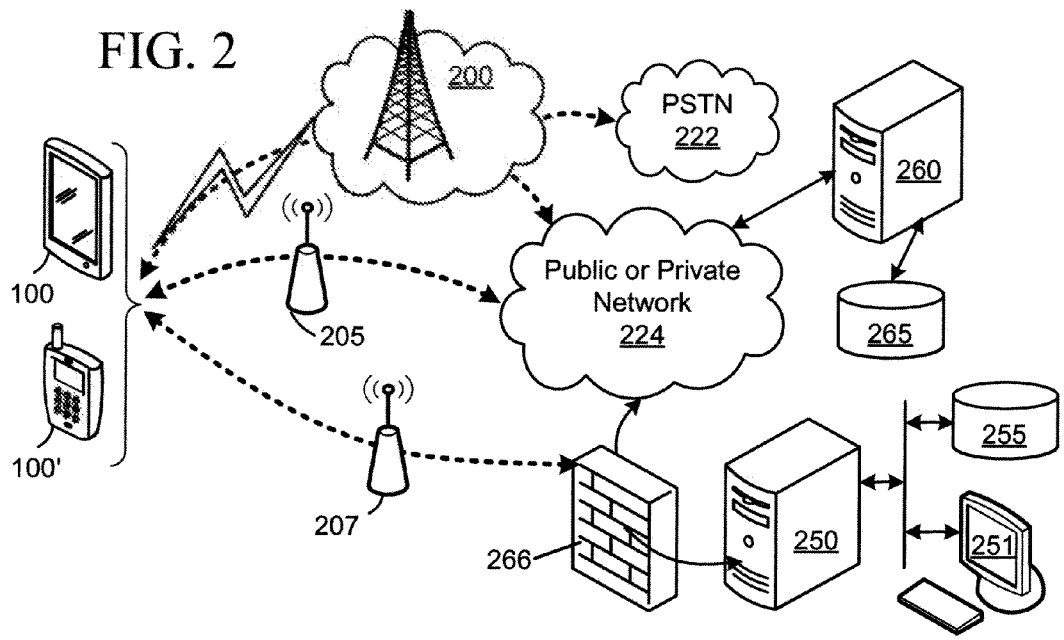
FIG. 2 is a schematic diagram of an example network for use in communicating with the electronic device of FIG. 1.

FIG. 2 illustrates an example of a possible network topology that may be used with the example electronic device 100. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. A host system may be provided, which can be an own-premises local area network (LAN), or wide area network in communication with LANs, with local computing resources such as one or more servers 250, one or more data repositories 255 and client devices 251 such as terminals or workstations. The servers 250 and data repositories 255 represent controllers, security and information technology policy modules, application servers, messaging servers, file servers, databases, memory devices and the like for providing services to users over the LAN and also over the public or private network 224 to users at their respective electronic devices, and to transmit data (such as messages) to destinations and receive data from outside the host system over the network 224. Host system and its elements will include, as will be appreciated by those skilled in the art, those components generally included in such devices, such as communication subsystems for communicating over one or more fixed or wireless networks, one or more processors, data stores, disk arrays, and the like. The services can include but are not limited to messaging, directory services, collaborative applications, calendaring applications, search engines and file servers, and it will be appreciated by those skilled in the art that the various network components 250, 255, 251 will be adapted for use with those services.

Messaging services are implemented using one or more servers 250 provided with means for storing messages (e.g., a database or a suitable data repository 255) for each message service or format available using the host system, such as email, instant messaging, voicemail, and the like. The server 250 (or a plurality of such servers) and its corresponding data repository 255 can therefore store all received and sent messages on behalf of each user, whether those messages originated inside or outside the host system. In some examples, messages sent and received by a user may be stored only locally on the user's client device and not maintained in a persistent store in the host system, while in other examples the messages are stored both locally at the client device as well as the server, in which case the message stores on the client device and the server are synchronized or reconciled periodically. The user device may be any suitable computing or communication device adapted for composition and transmission of messages such as the client devices 251 or electronic devices 100, 100' illustrated in FIG. 2. In fact, a single user may use multiple devices 251, 100, 100' to access the host system services. For ease of reference, a single electronic device 100 is referred to although it will be appreciated by the reader that these examples may be implemented using each of the client or electronic devices.

The host system may operate from behind a firewall or proxy server 266, which provides a secure node and optionally a wireless internet gateway for the host system. Client devices such as the electronic device 100 can then access the host system wirelessly through the firewall or proxy server 266, as denoted by the access point 207. External access to the host system by devices 100 may also be provided via a public or private network 224. The device 100 may be configured to access the public switched telephone network 222 through a wireless network 200, which may comprise one or more nodes 202 configured for communication in accordance a suitable mobile telephony standard. In turn, the wireless network 200 provides the electronic device 100 with connectivity to the Internet or other public wide area network 224, and thence to the organization's host system. Alternatively or additionally, if the mobile device is provisioned to communicate over wireless networks that are typically IP-based, such as wireless LANs implementing the Wi-Fi protocol (one or more of the IEEE 802.11 suite of protocols), personal area networks implementing other protocols such as BLUETOOTH® Bluetooth, other wireless networks implementing wireless broadband standards such as WIMAX™ (one or more of the IEEE 802.16 suite of protocols), and the like, the mobile device 100 accesses the public or private wide area network 224 through a third-party access point, such as the user's own personal access point and Internet connection, or a third party hotspot device, as denoted by the access point 205.

The services above, such as directory services and messaging, can be provided in a self-hosted system as suggested above, i.e., a host system supplied by and managed by the organization itself. However, the person skilled in the art will appreciate that one or more services provided to organization users may instead be provided by third parties in a software as a service, platform as a service, or infrastructure as a service arrangement, colloquially referred to as cloud computing services. For example, email messaging services or collaborative applications can be hosted by a third party service maintaining an external server 260 and data repository 265. Access to the external server 260 can be made available both externally to external client devices such as the electronic device 100, and to client devices 251 within the host system's LAN over the public or private network 224. Regardless, the host system's network services are made available only to those users who possess sufficient credentials to access the services, whether they are accessed internally or externally, and whether provided by the self-hosted or the virtually (externally) hosted system. Each user is therefore provisioned with an account for accessing the host system's services, whether self-hosted or externally hosted by a third party. Messaging services in particular are accessible by the users through messaging clients executing on the users' electronic devices 100 which communicate with a message server such as the server 250 or 260.

The person skilled in the art will appreciate that the network arrangements and host system described with reference to FIG. 2 comprise only one example, and that the examples described herein may be adapted to operate using any appropriate configuration of the organization's host system, any public or private network providing external access to the organization's host system, and regardless whether a user of the domain accesses the host system from within the organization's LAN or externally.

The electronic device 100, other client device 251, and/or the server 250, 260 (or another computing device in the host system) may be configured to implement the methods described herein. These examples are described principally with reference to text documents such as email messages, the general form and construction of which will be known to those skilled in the art. However, from the description below it will be appreciated by those skilled in the art that the specific examples provided herein can be applied, with suitable modifications, to other text-based documents and not necessarily messages alone. A "text-based" document includes content intended for consumption by a user that is rendered in a text form for presentation to the user; however, the document may include other content elements, such as images, video, scripts, and other embedded or linked content such as audio files and the like. Thus, while the document may contain text or be referred to as text-based, it may contain other types of content (e.g., binary content) and be encoded in a non-text format for transmission.

In particular, the document may be a structured document, or else comprise at least in part structured content. A structured document or structured content includes documents and content generated using an SGML or XML-compliant, XML-like, or XML-based markup language, which, as those skilled in the art will appreciate, includes HTML-based documents such as webpages. Structured documents or content may include or be delivered to a receiving device in association with other elements such as scripts or rich media files, which can be delivered together with the structured document to the electronic device 100, or downloaded separately by the application rendering the document or content when the structured document or content is rendered for display. These structured documents can be processed and presented using applications such as the browser 160, content readers 178, and other suitable user agents, including the email messaging application 155 and other messaging applications capable of presenting structured content. Structured content and applications described herein may conform to known standards for the structure and presentation of content, in particular HTML4 and HTML5, published by the World Wide Web Consortium (W3C) at w3.org. In addition, the within embodiments may comply with companion, alternative, subsequent and predecessor standards and specifications, including without limitation other versions of HTML, XHTML 1.0 and 2.0, DOM Levels 1 through 3, and CSS Levels 1 through 3, also published by the World Wide Web Consortium (W3C) at w3.org.

Such structured documents and content may, of course, contain text and may be considered text-based. Therefore, while the examples provided below are directed to email messages and email messaging client applications, it should be understood that the description should not be read as limiting and can be extended to other types of text-containing or text-based documents and content, and namely, structured documents and content, as well as their associated software applications for rendering and presenting those documents and content for display. Indeed, as those skilled in the art will realize, when email messages are accessed using a web-based service, the email message data is in fact delivered to the user for presentation in a webpage. Therefore an email message may not merely contain structured content; it may also be contained within a structured document itself.

Turning to the specific, non-limiting example of email messages, such documents may be formatted to improve their visual appearance or organization. The visual appearance of electronic messages, including email and other suitable text-based messaging media, can be enhanced through the application of presentational formatting instructions (e.g., specifying font face, size, color, indentation, bulleted and ordered lists, layout, position of images or embedded media content, and the like). Formatting of this nature is typically specified by the author using an appropriate message composition application, which can be a messaging client, word processor, text editor, and the like. In the case of an email message, the formatting directives (e.g., instructions or declarations) are typically included with the message content for transmission to the recipient, rather than providing them in a separate document. Once the message is composed, its message body content is saved in one or more forms; there may be an HTML or other formatted version, which contains formatting directives corresponding to any formatting the user applied in authoring the message; there may be a plain text version, in which any formatting directives are removed and all text is converted to a standard encoding (such as ASCII, UTF-8, etc.); and there may be one or more other formatted versions. All such versions may be included in the email message as sent to the recipient. In the case of a webpage or other HTML document, formatting directives are often provided in a separate CSS (Cascading Style Sheet) document, which is referenced by the webpage and is usually retrieved by the recipient's user agent at about the same time the webpage is retrieved.

In this description, "formatting", "format" and "formatted" are used generally to refer to "presentational" or "expressive" formatting; in other words, formatting directives that are directed to the appearance and/or layout of content. This is in contrast to document format, such as message protocol format or document type, used to define a document and/or its content for the purpose of compatibility with a particular protocol, system, or application (e.g., "email format"). Examples of presentational formatting include, but are not limited to, presentational, procedural and descriptive markup such as embedded binary codes, and/or semantic markup such as RTF, HTML/CSS, and lightweight markup languages that will be known to those skilled in the art.

Figure 3:
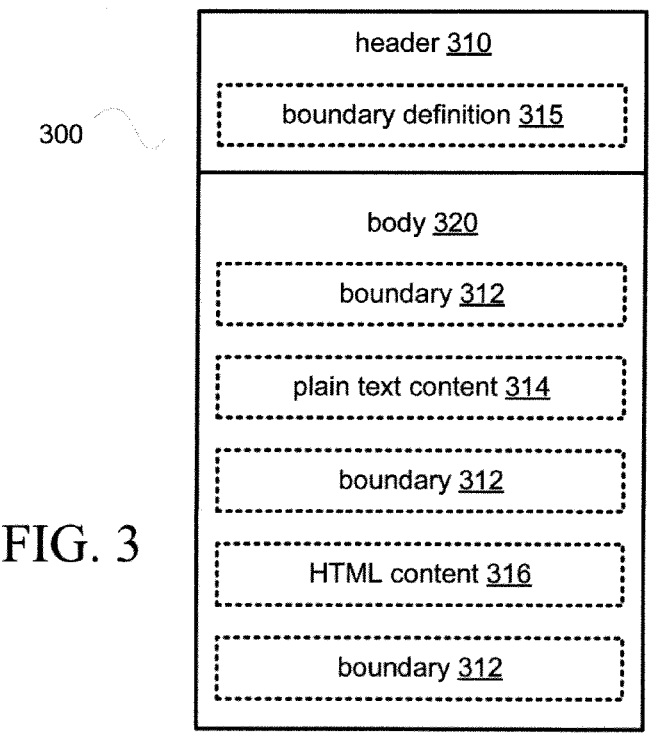
FIG. 3 is a schematic diagram of components of an email message.

When an email message includes presentational formatting, it is typically made compliant with the MIME (Multipurpose Internet Mail Extensions) standard as specified in RFC 2045 and its companion standards, published by the Internet Engineering Task Force. In particular, such an email is typically constructed as a multipart MIME message, including not only a formatted version of the email body, but also a plain text version in the event the recipient client is unable to process a formatted version. FIG. 3 provides a basic schematic of the components of a multipart email message 300, containing a header 310 and body 320. In addition to typical routing, address, and identifier information included in the header 310, the multipart message includes a definition of a boundary value 315. The boundary value generally comprises a string that is sufficiently unique so as to be distinguishable from any other content of the email 300 (for example, it may be randomly generated). The beginning and end of each "part" of the message body 320 is then marked by this boundary value, as shown in FIG. 3. Thus, the body 320 begins with a first occurrence of the boundary value 312, followed by plain text content part forming the message author's actual message content (e.g. ASCII text) 314. This first version of the message content is followed by a second occurrence of the boundary value 312, then an HTML content part 316, which is a version of the plain text content. This HTML version may include presentational formatting. Finally, the message body 320 terminates with a final repetition of the boundary 312. The email may contain additional parts, such as an RTF or lighter-weight marked up version of the formatted content, as well as non-text parts. It will be understood by those skilled in the art that an email message containing formatted text need not be provided in multipart format; in fact, only one message content part, the formatted portion, need be provided. Of course, the message may also be provided in a proprietary form or proprietary encoding.

An example of an HTML content part 316 of a multipart message is provided in Table 1 below:

TABLE 1

Excerpt of HTML content part of a message.

```
<html>
<head>
<title></title>
</head>
<body>
<div style="direction: ltr; font-family: Arial, sans-serif; color:
#000000; font-size: 11pt;">Dear Coffee Fans:<br><br>It has come to our
attention that some of you are skirting protocol vis a vis the coffee
maker located in the break room adjacent Bay 11. Please turn the
machine <span style="font-weight:bold; font-style:italic; font-size:
14pt;">OFF</span> when the carafe is <span style="font-weight:bold;
font-style:italic; font-size: 14pt;">EMPTY</span>. To do otherwise
<u>WRECKS THE CARAFE</u>!
<span style="font-family:"Wingdings"; color: #000000">LL</span>
<ul><li>Your hazmat suit does NOT exempt you <span style="font-size:
9pt;">(it takes but a second to unzip the mittens)</span>.</li>
<li>Holding the blast door open with your foot likewise does NOT exempt
you <span style="font-size: 9pt;">(you can use the spent fuel rod next
to the door for this purpose, that's what it's
for!)</span>.</li></ul>
<p>There shall be <strong><u>NO EXCUSES</u></strong> from this
point forward and the next one of you who blackens a carafe shall <span
style="font-style:italic; color:#ff0000">PERSONALLY</span> REPORT
to Housekeeping themselves!!!<br><br></div>
</body>
</html>
```

The code in Table 1 above includes typical HTML document elements, including a head (<head> . . . </head>) and body (<body> . . . </body>) as well as a number of content elements contained within the body, including a <div> containing text blocks and a bulleted list (<ul> . . . </ul>). The text itself contains further formatting markup defining various text attributes, such as font weight (e.g., font-weight:bold, <strong> . . . </strong>), style (font-style:italic), font color (color:#ff0000), decoration (<u> . . . </u>), and font face (font-family:"Windings") as well as font size (font-size: 9pt, font-size: 14pt, font-size: 9pt). Many of these attributes are applied to text contained within an identified span (<span . . . </span>).

The plain text content part 314 of the same message would thus appear as shown in Table 2, with all formatting directives are stripped out:

TABLE 2

Excerpt of plain text content part of a message.

Dear Coffee Fans:
It has come to our attention that some of you are skirting protocol vis
a vis the coffee maker located in the break room adjacent Bay 11.
Please turn the machine OFF when the carafe is EMPTY. To do otherwise
WRECKS THE CARAFE! LL
•   Your hazmat suit does NOT exempt you (it takes but a second to
unzip the mittens).
•   Holding the blast door open with your foot likewise does NOT
exempt you (you can use the spent fuel rod next to the door for this
purpose, that's what it's for!).
There shall be NO EXCUSES from this point forward and the next one of
you who blackens a carafe shall PERSONALLY REPORT to
Housekeeping themselves!!!

When a formatted email message is received by a recipient electronic device 100, the recipient's messaging client parses the formatting directives included in the message that it supports, and applies them to the message content when it is rendered for display to the extent that the formatting directives are supported by the layout engine or other rendering module (for example, the directive may specify a font face that is not available at the recipient device, in which case another font face may be substituted, or the directive ignored). As is generally understood, formatting directives may be directed to the appearance of individual content elements contained within the message (e.g., font face, size, decorations and color; text spacing and line height; the size of images; background colors and outlines) as well as the relative positioning of individual elements with respect to each other and with respect to the bounds of the rendered message and/or the viewport in which the rendered message is viewed (e.g., margins and padding, text justification, indentation, ordered and bulleted lists).

Thus, formatting directives that can be specified for an email message include specification of dimensional attributes of its various content elements or their containing structures. The attribute of font size, for example, either expressly or inherently determines the displayed size of the text characters in the document. Another example is text line height, which determines the spacing between vertically adjacent lines of text. Other examples of dimensional attributes that do not necessarily relate to text content include the sizes or widths of the aforementioned indentations, borders, margins, and padding around various content elements of a document. Other examples will be known to those skilled in the art.

Formatting directives may specify fixed values for these content element attributes (e.g., a text size of "12pt", meaning 12-point font, or padding of "2px", meaning two pixels wide). Examples of such directives are provided in Table 1 above, such as "font-size: 14pt". Such values may be considered to be "absolute" values, since the value is independent of any default or base settings configured in the user agent (i.e., the messaging application, browser or other application) or operating system 140, or for the document itself. Absolute values are typically expressed in points (pt), pixels (px), picas (pc), centimetres (cm), or any other suitable physical unit of length.

While absolute font size values suggest that font size can be selected and expressed with great care by the author of an email or other document, the choice of an absolute font size is often done by the author only with reference to the email message as it appears on the author's own display screen. The process of rendering an email message may be similar on different devices; however, once rendered, the formatted text that is output to the display may have different physical measurements on different devices. The display screen size may range from a large desktop monitor to a small cellphone screen; the resolution of an electronic device display can also vary from device to device, even those with similarly-sized screens. For example, a font size of 16px (16 pixels high) will have about a 0.18" height when displayed on a display screen with a density of 85 ppi (pixels per inch). The same font size would be more than 40% smaller on the same size screen with a density of 160 ppi. The email author may not know how the recipient will view the email message; the recipient may use a desktop monitor or a small cellphone. Thus, specifying a fixed, absolute dimension for a document feature in this manner may cause that feature to be more or less illegible or visually indiscernible by the user of the displaying device.

This problem is confounded by the fact that users tend to position display screens at different distances from their eyes, depending on device type and size. A large desktop screen is typically positioned up to arms' length from the user's face, while a small smartphone or tablet is held much closer. This is due in part to the relative size and resolution of the display screen, but is also due to the user's need to operate devices with integrated display screens: the user of a smartphone or tablet needs hold the device and manipulate buttons or a touchscreen on the smartphone or tablet, but the user of a desktop monitor does not, since the monitor sits at some distance away from the user's face. At present, the author of an email message or other document can attempt to predict the likely appearance of the document on other platforms by using simulators or services that capture screenshots of documents rendered using different user agents and mobile devices, but cannot necessarily anticipate every condition under which the document might be read.

Figure 4:
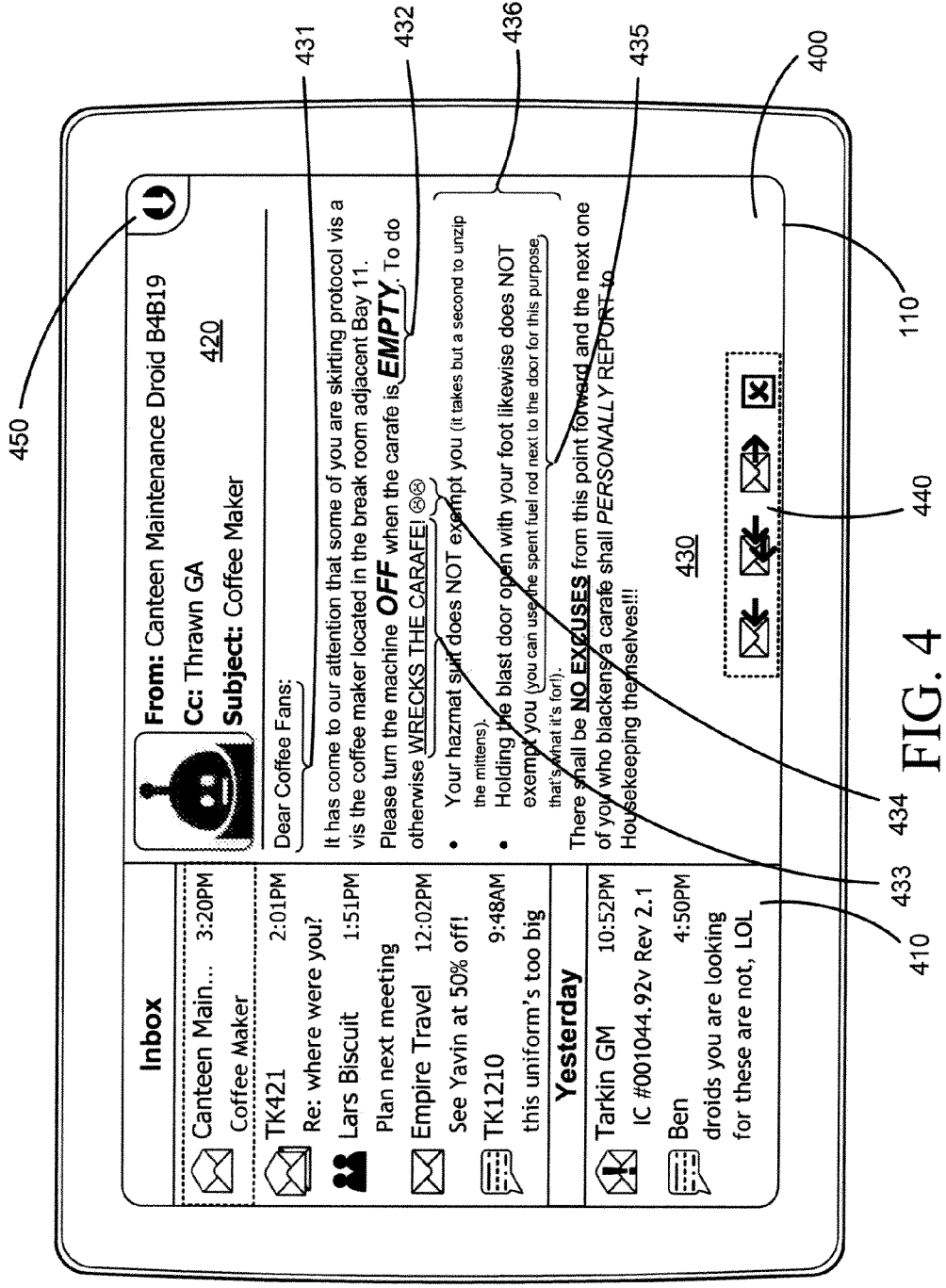
FIG. 4 is an illustration of an example message display screen with a first message.

An example of the consequence of absolute font sizes is illustrated in FIG. 4. FIG. 4 shows an example message display 400 on a display screen 110, showing the formatted version of the message depicted in Table 1. The display 400 includes a left pane containing an inbox listing 410 and a right pane divided between a header display region 420 and a message body display region 430. In addition user interface elements 440, 450 are optionally provided: elements 440 may be actuated by the user (for example, by tapping or double-clicking) to invoke commands such as reply, reply-all, forward, and delete. User interface 450 includes an arrow icon, indicating to the user that further commands can be accessed by "pulling" the arrow icon downwards, for example by swiping down the screen or clicking and dragging.

As suggested by the formatting in Table 1, the message displayed in regions 420, 430 includes text formatted in a variety of ways. Basic text in this example, such as text 431, is formatted at a first font size (referring to Table 1, it can be seen that this font size is 11pt), while other text 432 has a heavier font weight, a different style, and a larger font size (font-weight:bold; font-style:italic; font-size: 14pt). Other portions of the text such as 433 have different text decoration (underlining, <u> . . . </u>), while still others have a different font faces 434 (font-family:"Wingdings") or a smaller font size 435 (font-size: 9pt). In addition, some text is intended and bulleted in a list 436. Thus, while this message is entirely text, a number of formatting directives have been applied to cause various parts of the text to appear different than others. However, the text with the smaller font size 435 may be too small to be legible to the user, or too small to be rendered clearly by a low-resolution display screen 110.

Given these considerations and the general need to maximize accessibility to all users of electronic devices, it is desirable to permit the user to enlarge the text of a displayed message at will. Resizing the text content of a message is a different process than enlarging the message itself. When an entire message is enlarged on a display screen, the text size is increased, but so are all other content elements displayed in the message. This may require the user to scroll both vertically and horizontally through the message in order to read it all, and may require the electronic device 100 to cache additional data in a backing store so that it can be retrieved for display when the user scrolls to a previously-undisplayed region of the document. On the other hand, when text content alone is resized, the remaining content elements in the email message or other document remain at their originally displayed size. The enlarged text may need to be reflowed in order to fit within the same region of the document, but this may be accomplished without requiring the user to scroll horizontally to view other content. However, when font size is specified as an absolute value, the user agent may not be configured to override the formatting. In the example of Table 1 and FIG. 4 above, all text was defined as having an absolute font size measured in points. Accordingly, the messaging application providing the message display screen 400 may not be capable of re-rendering the message with a larger text size.

Instead, the font size attribute in an email or other document may be specified as a relative value. First, a base value for this attribute may be defined for a given email message or other document. This base value may be set as a default value by the user agent, or may be set globally for the electronic device 100 in the operating system 140. A typical default value for font size in a desktop computing environment is 16 px (pixels). Alternatively, the base value may be set within or for the document itself in a formatting directive. If a base value is set for the document, then this value is typically applied in place of a default setting of the user agent or operating system, unless the user agent or operating system is configured to override document-specific formatting directives. If not base value is set for the document specifically, then the default value is used as the base value.

In HTML and CSS, the CSS font-size property can be defined either numerically or descriptively as a relative value with reference to the base value. Font size may be defined relatively as a percentage (90%, 100%, 120%) or with reference to the em unit ("0.9 em", "1.0 em", "1.2 em"), where 100% is the base font size, and 1.0 em is the width of the "m" character in the base font size. Thus, if an email message included a base font size setting of 20px and text within the message was formatted with a relative font size of 0.8 em, the size of that text would be 16px. The font size of 0.8 em is thus a "relative" attribute value because its proper interpretation must reference the base font size value.

Font sizes can also be defined relatively using descriptive terms such as "x-small", "small", "medium", and "large" or their numerical equivalents (1, 2, 3, 4 . . . ), where, for example, "medium" or "4" is the default size defined by the user agent. For each step larger or smaller, the increase or decrease in font size may be defined as about 20%. For example, if the default font size were 12pt, then size "x-small" or "2" would be 40% smaller than 12pt, or 7.2pt. These font sizes are "relative" in that they are dependent on the default size set by the user agent or operating system.

Resizing text with a relative font size value can be accomplished by simply changing the base value for the message. The font sizes within the email message can then be recomputed since they are all relative to the base value. Thus, one alternative to resizing an entire message that was formatted with absolute font size values is to retrieve only the plain text content portion of the message instead of the HTML or other formatted content portion, and to render and display the plain text only. Because there are no font size directives contained in the plain text, the messaging application can apply its default font size, which is presumably set at a size that is suitable for the display screen 110. However, as can be seen from Table 2, the plain text version of the message lacks any formatting at all, including font weight and font face; displaying the plain text version will thus remove some of the context or meaning from the message. For example, without the application of the "Wingdings" font face to the "LL" contained in the text, the emoticons displayed in FIG. 4 will be displayed as ASCII characters. Further, the author's intended visual emphasis on words such as "OFF" and "EMPTY" is also lost.

Figure 5:
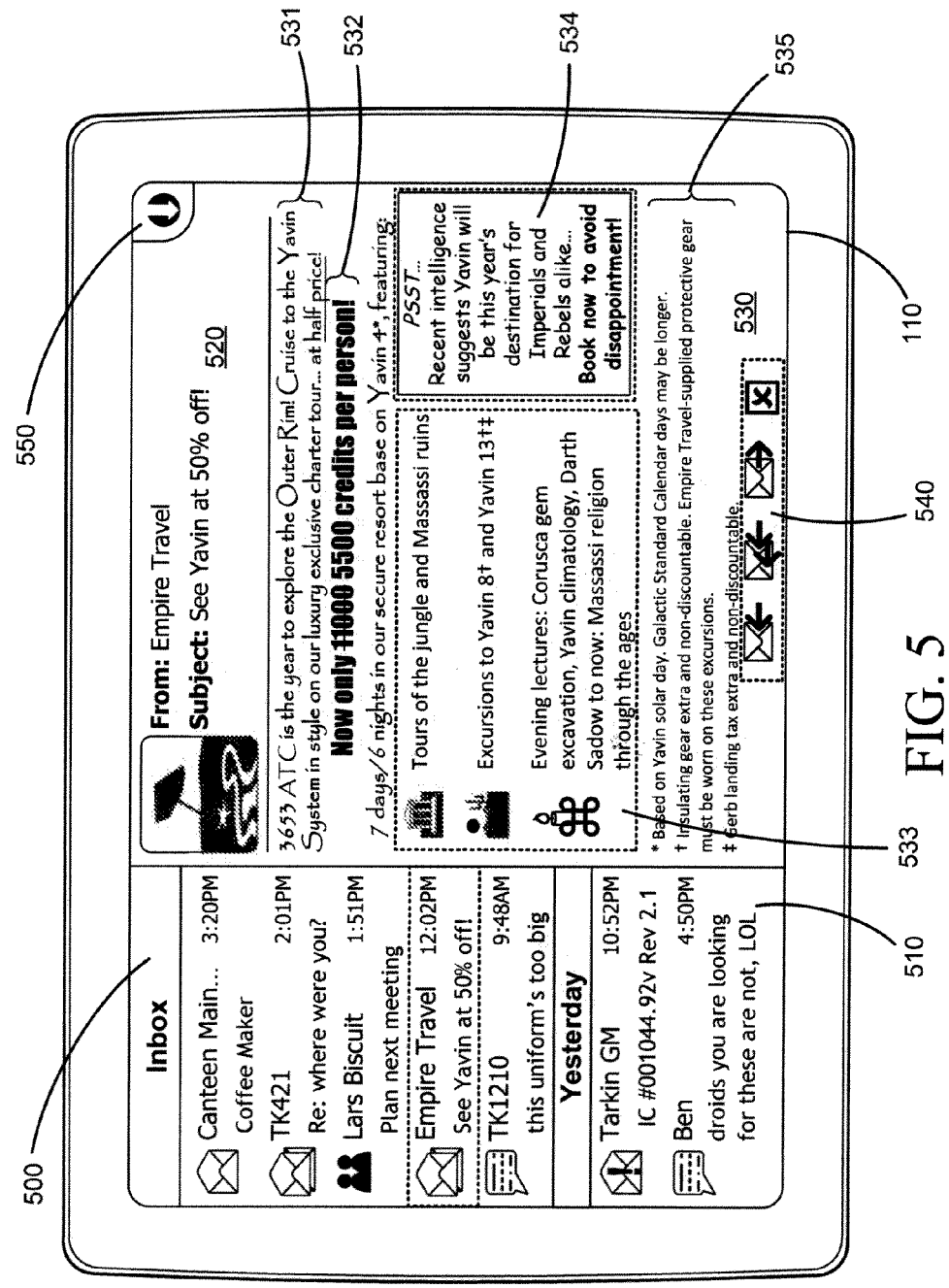
FIG. 5 is an illustration of a further example message display screen with a second message.

Another option is to programmatically replace any absolute values in the message formatting with relative values before the message is rendered for display. However, indiscriminately converting all absolute font sizes to relative font sizes may also "break" email message formatting. Turning to a further example, a more complex email message is shown in FIG. 5. In FIG. 5, a further message display screen 500, again including a message inbox 510, a message header display region 520, a message body display region, and user interface elements 540 and 550, is displayed. The formatted message displayed in region 530 includes not only text with multiple font faces (such as text 531, as compared to text 532 and 534), but also image elements and text contained within a table element 533, centered and bordered text 534, and text with a small font size 535. The corresponding HTML code that might be contained in the HTML content part 316 of the email is shown in Table 3:

TABLE 3

Excerpt of HTML content part of a message.

<html>
<head>
<style type="text/css">
body {font-family: Calibri, sans-serif; font-size: 10pt; margin: 0; padding: 0; color: #000;}
p {margin: 0; padding: 0;}
a:link {text-decoration: underline; color: #990077;}
.style1 {font-family: Papyrus, fantasy; font-size: 9.5pt; color: #331144;}
.style2 {font-family: Impact, Charcoal, sans-serif; font-size: 12pt; color: #F00; text-align: center;}
.style3 {font-family: Comic Sans MS, cursive; font-size: 9pt; color: #08B; line-height: 11pt; text-align: center; border-width: 1px; border-style: dashed; border-color: #08B;}
.style4 {font-size: 10t;}
.footnote {font-size: 8pt; color:#666}
</style>
</head>
<body>
<div style="width:400px">
<div class="style1">3653 ATC is the year to explore the Outer Rim! Cruise to the Yavin System in style on our luxury exclusive charter tour... at <u>half price!</u></div>
<div class="style2">Now only <strike>11000</strike> 5500 credits per person!</div>
<div class="style1">7 days/6 nights in our secure resort base on Yavin 4*, featuring:</div>
<div align=center>
<table><tbody><tr><td width="70%"><table><tbody>
<tr><td><img src="http://etravel.ds/campaign/37b3d/g1.jpg" height=30px width=40px"></td><td><div class="style4">Tours of the jungle and Massassi ruins</div></td></tr>
<tr><td><img src="http://etravel.ds/campaign/37b3d/g2.jpg" height=30px width=40px"></td><td><div class="style4">Excursions to Yavin 8† and Yavin 13† ‡</div></td></tr>
<tr><td><img src="http://etravel.ds/campaign/37b3d/g3.jpg" height=50px width=40px"></td><td><div class="style4">Evening lectures: Corsuca gem excavation, Yavin climatology, Darth Sadow to now: Massassi religion through the ages</div></td></tr></tbody></table></td>
<td><div class="style3">PSST...<br>Recent intelligence suggests Yavin TABLE 3-continued Excerpt of HTML content part of a message.

will be this year's destination for Imperials and Rebels alike...<br><strong>Book now to avoid disappointment!</strong></div></td>
</tbody></table></div>
<div class="footnote"><p>* Based on Yavin solar day. Galactic Standard Calendar days may be longer.</p>
<p>†Insulating gear extra and non-discountable. Empire Travel-supplied protective gear must be worn on these excursions.</p>
<p>‡Gerb landing tax extra and non-discountable.</p></div>
</div>
</body>
</html>

In this case, a number of the formatting directives are not contained in the actual meaningful text content of the message, but are instead contained as a set of CSS declarations (<style> . . . </style>) in the header portion of the HTML document. Those skilled in the art will understand, however, that more complex formatting directives such as the CSS declarations may be embedded in the actual message content within the <body> portion of the message. Rather than explicitly defining a font size for each part of the message, a number of styles are defined (e.g., style1, style2), and font attributes are associated with each of them. While this type of HTML formatting may be implemented in a casually composed email message (for example, between coworkers or friends, as in the example of FIG. 4), the use of CSS declarations is more commonly used as a typical feature of a more "professionally-composed" email message, such as an advertisement. Likewise, the use of tables and images in the manner illustrated in FIG. 5 is also more typical of a professionally-composed message.

The complexity of this message as compared to FIG. 4 is clearly seen in a comparison of FIGS. 6 and 7, which illustrate the DOM tree structure of the HTML body of the messages of FIGS. 4 and 5, respectively. The first email message, FIG. 4, has a relatively simple structure 600: the <body> of the HTML content part contains a first container <div> 610, which in turn contains an unordered (bulleted) list <ul> 620 with a plurality of list elements <li>. These content elements can be seen in Table 1 above.

The structure of the email message of FIG. 5 and Table 3, on the other hand, is clearly more complex, as can be seen from the HTML body structure 700. The <body> of the HTML content contains a first container <div> 710, similar to FIG. 6. However, that <div> 710 contains a further five <div> containers 720, 721, 722, 723, 724 and 725. Each of the first three <div> containers 720, 721, 723 contains text (including text 531 and 532 of FIG. 5), as can be seen in Table 3, as does the fifth container 725 (the text in this container is divided into paragraph elements <p> and corresponds to the text 535 of FIG. 5). The fourth <div> 724, on the other hand, contains a number of further HTML structural elements, including a first <table> 730. An HTML <table> element typically contains at least one row element <tr>, which in turn contains at least one cell element <td>. In this example, the single row <tr> contains two cells <td>. The first of these two cells contains a further <table> element 740, with three rows, each with two cells. This table is indicated in FIG. 5 at 533. Each row of the <table> 740 contains a cell <td> 750, 751, 752 containing a single image element <img>. The remaining cell of each row contains text inside a containing <div>. The remaining cell <td> of the table 740 contains text as well, which is indicated in FIG. 5 at 534. In other words, the HTML structure of the message of FIG. 5 and Table 3 is of a type that typically requires planning on the part of the author in order to align images with corresponding text, and to position separate blocks of text adjacent to each other (as in 533 and 534).

It may be noted that like the email message of FIG. 4, the font sizes of this message are also defined with absolute values (as can be seen in the <style> portion of the header in Table 3), and that some font sizes—such as the font size of text 535 in FIG. 5—may be too small to be legible on the display screen 110. A difficulty with the solutions suggested above of displaying only a plain text version of the message, or replacing all font sizes defined as absolute values with corresponding relative values, is that the removal of the original formatting may render the message less intelligible. As those skilled in the art will appreciate, the conversion of the message to plain text may result in some text blocks of the original table being reordered (e.g., blocks 533 and 534). Moreover, removal of all HTML tags and formatting directives would include removal of the <img> tags (e.g., <img src="http://etravel.ds/campaign/37b3d/g2.jpg" height=30px width=40px">) that contain directives to retrieve images from the specified address for inclusion in the rendered message.

A difficulty with simply replacing the absolute font sizes defined in the message as suggested above is that in such a complex message layout, the increase in font size might result in the resizing of elements (such as the cells in table 533, or the text in cell 534) such that other elements in the email message are displaced. For example, if the font size of the text in cell 534 were substantially increased, the cell may need to be resized to accommodate the increased text size. This resizing may have the effect of pushing the lower text 535 downward, or squeezing the neighbouring cell containing table 533 to the left, rendering the text in that table less legible. In other cases, a particular absolute font size may have been selected because the text was intended to fit within a space defined with an absolute dimension. In that case, altering the font size would alter the fit of the text in the designated space. This is less of a concern, however, when the email message does not have such a complex structure, such as the email message of FIG. 4 and Table 1.

Accordingly, rather than substituting the absolute font sizes in all received message with relative-sized fonts, this substitution is only carried out for those messages that have a simpler structure. Those messages that are more intricately structured are left in their original state and not modified, since their layout is more likely to be dependent on the precise font sizes and other dimensional attributes that were defined for the message content.

The process of identifying the first type of message, which may have a simple structure, may be carried out either at the electronic device 100 or client device 251 receiving the message from the message server 250, 260, or at the server 250, 260 or an intermediate point between the server and the electronic device 100 or client device 251. If this process is carried out at the electronic device 100, then it may be implemented immediately before the message is displayed at the electronic device 100 or 251. However, it may be more efficient to carry out the process prior to that point, for example as the message is received and processed for storage in the local mail store 157. At some time, once the message is received, whether by the electronic device 100 or server 250, 260, a determination is made whether the message is of the first type, or is the second type (i.e., the more complex message, with a layout that may be dependent on the specified absolute message sizes).

There are a number of indicators that may expressly or implicitly signify that the message is of either the first or second type. An express indication that the message is of the second type, for example, may be a flag or field that is voluntarily inserted by the email sender to indicate its commercial nature, or to indicate that the email content should not be modified. For example, a field may be inserted in the header of the email indicating that the message is an advertisement ("x-ad: yes") or to indicate that the message is not compatible with accessibility features ("accessible: no"). Upon locating such a field in the header, the messaging client or server will not attempt to modify any font size attributes in the message.

Given that the first type of message is a more "casual" communication, or a communication that is likely authored by an individual for the purpose of conveying textual information with few visual cues for personal or business purposes, it is more likely to be a message that is sent by a known contact of the recipient. Therefore, other header data such as sender or recipient address may be used to infer whether the message is of the first type or the second type.

For example, if the receiving message server or client application determines that the sender of the message is included in the recipient's personal address book, or in a directory maintained at the host system, then it is more likely that the message is of the first type; similarly, if both the sender and recipient are members of the same domain (e.g., are associated with the same host system), again it is more likely that the message is of the first type. On the other hand, if the reply-to address of the message is not consistent with the actual sender address, IP address, or domain, then the message may be a more "professional" kind of message, such as an advertisement, retail communication (such as an order confirmation), newsletter, and the like, and is therefore more likely to be the second type. Similarly, if the sender address includes a recognizable string such as "no-reply" (a common practice when an automated message is sent to a recipient relating to a retail transaction), then the message may be of the second type.

The recipients of the message may also provide an indication whether the message is of the first type or second type. For example, it is more common practice for individuals, in their personal and business communications, to include carbon copy (Cc:) recipients for their email messages, and it is less likely that an advertisement, retail communication, etc. would be addressed to Cc: recipients, since those types of messages are usually sent using a bulk mailing service that addresses the messages to individual recipients only. Thus, a message with one or more Cc: recipients indicated in the header is more likely to be a message of the first type.

The body of the email message—and particularly the structure of the formatted content itself—may also be analyzed for indications whether the message is the first type or second type. Referring again to the email messages of FIGS. 4 and 5, and the corresponding DOM tree structures of the <body> elements of their respective HTML content parts, the presence of certain types of elements, and particularly their interrelationship, may indicate that a message is likely to be the second type.

For example, <table> elements are frequently used in email messages to align content in orderly rows and columns. In individual, interpersonal conversation, tables may be used to organize content. Typically, that content consists of text (either phrases or numbers). In promotional or professionally-designed email messages, however, tables are often used to align image content, particularly where the email consists primarily of images. Thus, the presence of tables with individual cells (<td>) containing only image elements (<img>) can be an indicator of an email of the second type. An example of this can be seen in FIG. 5 at 533, and the accompanying formatting in Table 3. In addition, since it is considered good practice for accessibility to include alternative text captions ("alt text") for images in an HTML document so that the alternative text can be read by a screen reader for the visually impaired, professionally-crafted, complex messages are more likely to contain such text. While individuals may send casual email messages including a large number of images (for example, a user may wish to send photographs of a recent vacation to a friend), those images are rarely organized in a <table> structure, and are likely to be attached as attachments to a plain text message without any alternative text.

Also with reference to images, promotional messages with complex structures are more likely to employ client-side image maps (i.e. images with clickable areas). Thus, the presence of a <map> element in the email message can also be construed as an indicator that the message is of the second type.

The sheer complexity of the DOM tree structure of an HTML email message can also be an indicator. As mentioned above, the structure of the first email of FIG. 4 is extremely simple, as shown in FIG. 6; there exists only two sets of nested elements in the containing <div> 610 of the message body 600 (the <ul> within the <div>, and the <li> within the <ul>). Excluding text blocks, there are only four elements total within the <body>: one <div>, one unordered list, and two list elements. The email of FIG. 5, however, contains nested tables 730 and 740, and also contains multiple nested <div> containers 720-725, contained in 710, as well as <div> in the table cells of the table 740. Thus, the existence of nested tables (at least one <table> nested in the cell of another) or the existence of nested <div> (at least one <div> nested in a parent element) may be interpreted as indicators that the message is of the second type.

Similarly, the existence of multiple sibling <div> elements—the elements 720 to 725, which are all children of the same parent <div> 710—can also indicate that the message is of the second type. Thus, a DOM tree that is more "treelike" rather than merely linear may also be an indicator of the second type.

Complexity of the email message structure may also be determined by a simple count of the number of <table>, <div>, or other structural elements in the HTML body. In the email of FIG. 4, for example, there exists only one <div>; in the email of FIG. 5, there are nine. Thus, a rule may be established that if a message contains more than a threshold number of <div>, <table> or other structural elements, it is of the second type; as those skilled in the art will understand, consequently, if the message contains less than the threshold number of structural elements, it is of the first type.

Overall, the determination whether the message is of the first or second type may be made exclusively on the basis of the DOM structure of the message's HTML content, although it may also be made based on a combination of the message body content and the message header. Generally, however, when a message is received, it may be initially presumed or determined that it is of the first type unless an analysis of the message indicates that it is likely of the second type. Since some of the example indicators described above are reliant on a parsing of the HTML content, which is typically carried out when the message is being rendered by the layout engine for display, the determination whether the message is of the first or second type is conveniently carried out at the point where the HTML content is parsed for rendering.

Once the message is determined to be of the first or second type, a flag or field value may be inserted in the message header indicating the message type. When the message is subsequently accessed, the message server or messaging client can check for the presence of the field and its value; if the field exists, then there is no need to repeat the determination step.

If the message is of the first type and its formatting directives include font size attributes with absolute values, the formatting directives are then modified to convert the absolute values to relative values. A conversion scheme may be defined to normalize absolute font sizes against relative sizes. The conversion scheme may correlate a 12pt or 16px font size with the "base" font size, which itself can be defined as a relative value (e.g., 1 em); any absolute font sizes smaller than 12pt/16px are converted to a corresponding relative value. Taking the example of FIG. 4 and Table 1, the font sizes of 11pt, 9pt, and 14pt defined in the message's formatting directives could be converted to values of 0.9 em, 0.7 em, and 1.2 em, respectively. The determination of relative values may vary from this example; for example, the font size that is used with the most elements in the email message (i.e., the "dominant" font size) may be taken as the "base" font; thus, based on Table 1, the 11pt font size would be considered equivalent to 1 em, and 9pt may be converted to 0.9 em and 14pt to 1.3 em.

Alternatively, the range of font sizes defined in the email message may be normalized against an acceptable set of relative sizes. It may be determined, for example, that font sizes may take the relative values 0.8 em, 1.0 em, 1.2 em, and 1.4 em; any font sizes that would fall below 0.8 em would be assigned the value 0.8 em, and any font sizes exceeding 1.4 em would be assigned 1.4 em as a value. Each of these relative values would then be correlated to a range of pixel/point sizes, such as 0.8 em=font sizes less than <14px; 1.0 em=font sizes from 14px to <18px; 1.2 em=font sizes from 18px to <22px; and 1.4 em=22px and greater. If the dominant absolute font size of the email message is determined, this font size is correlated to 1.0 em, and other smaller and larger absolute font sizes correlated to the remainder of the set of relative sizes.

Any relevant formatting directives, whether contained inside <style> tags in CSS declarations in the HTML header, <font> tags in the HTML body, or in inline style declarations (e.g. the <span> inline elements), are changed. In Table 1, only <span> elements are present. In addition, other formatting directives affecting the spacing of text may be removed as well, such as custom line-height declarations.

Next, a base font size is declared for the document. This declaration may be inserted at the beginning of the HTML content portion, in the <head> section. The base font size may be preselected for all messages that are modified for the receiving electronic device 100 or client device 251, and may be determined by the specific physical characteristics of the display screen 110 (such as the pixel density and/or screen dimensions). For example, it may be determined that an appropriate base size is 18px. Once the absolute font sizes are replaced and the new base font declaration inserted, the HTML content part 316 of the email may appear as shown in Table 4:

TABLE 4

```
<html>
<head>
<style type="text/css">
body {font-size: 18px;}
</style>
<title></title>
</head>
```

TABLE 4-continued

```
<body>
<div style="direction: ltr; font-family: Arial, sans-serif; color:
#000000; font-size: 0.9em;">Dear Coffee Fans:<br><br>It has come to
our attention that some of you are skirting protocol vis a vis the coffee
maker located in the break room adjacent Bay 11. Please turn the
machine <span style="font-weight:bold; font-style:italic; font-size:
1.2em;">OFF</span> when the carafe is <span style="font-weight:bold;
font-style:italic; font-size: 1.2em;">EMPTY</span>. To do otherwise
<u>WRECKS THE CARAFE</u>!
<span style="font-family:"Wingdings"; color: #000000>LL</span>
<ul><li>Your hazmat suit does NOT exempt you <span style="font-size:
0.7em;">(it takes but a second to unzip the mittens)</span>.</li>
<li>Holding the blast door open with your foot likewise does NOT exempt
you <span style="font-size: 0.7em;">(you can use the spent fuel rod
next to the door for this purpose, that's what it's
for!)</span>.</li></ul>
<p>There shall be <strong><u>NO EXCUSES</u></strong> from this
point forward and the next one of you who blackens a carafe shall <span
style="font-style:italic; color:#ff0000">PERSONALLY</span> REPORT
to Housekeeping themselves!!!<br><br></div>
</body>
</html>
```

In the <head> element, a new <style> directive defining a font size of 18px in the <body> has been declared, and all font sizes previously defined in the <body> with absolute values has been replaced with relative values. Alternatively, the base font size may be set as an attribute of the <body> tag rather than in the <head>, such as <body style="font-size:18px">. The 18px font size declaration will be the only absolute value declared in the document. Since this new font size declaration was declared for the <body> of the HTML message content, it will cascade down to the rest of the directives in the electronic message. Accordingly all fonts in the document will be relatively sized.

Figure 8:
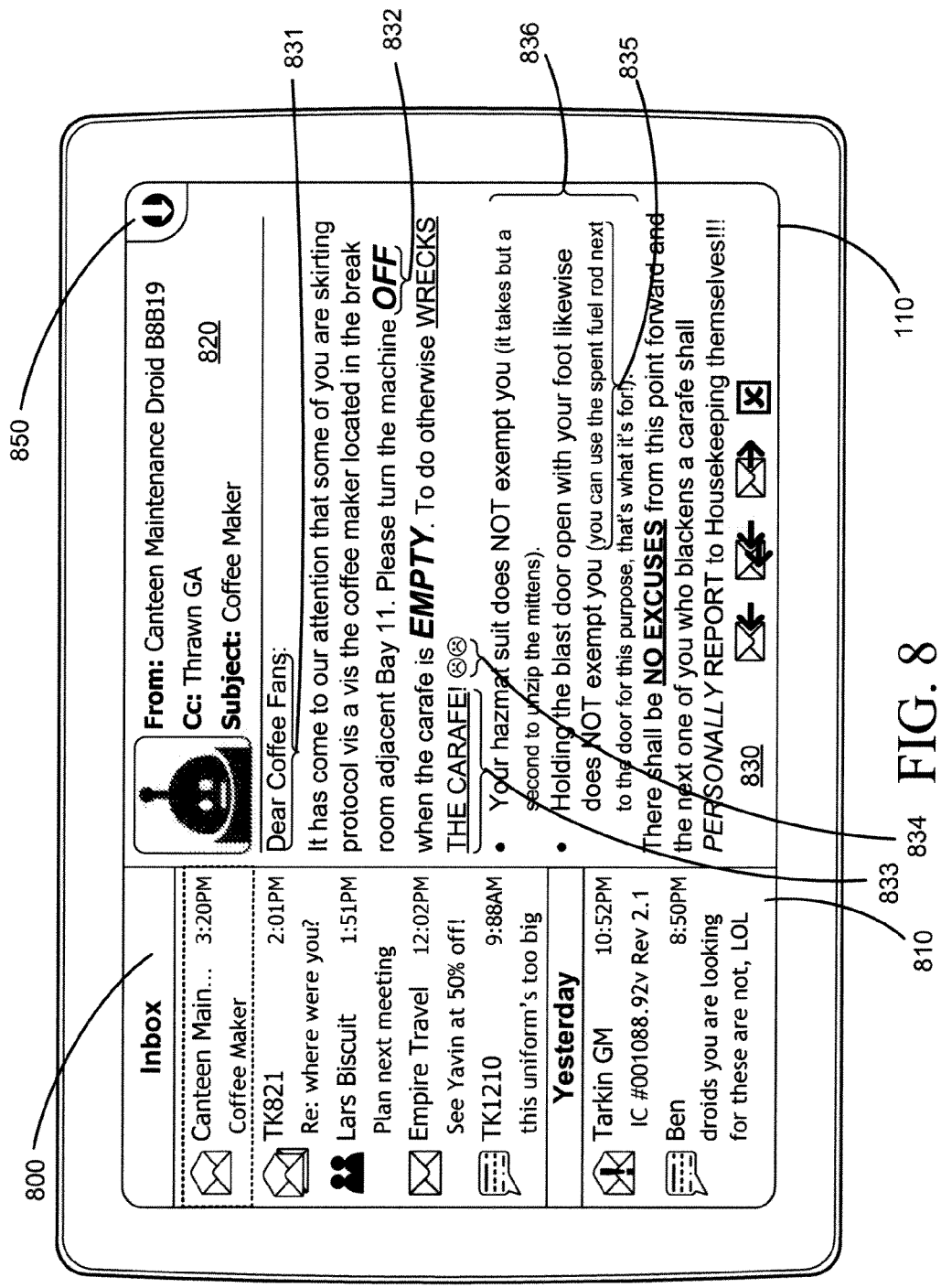
FIG. 8 is an illustration of a further view of the message display screen of FIG. 4 after modification of a message attribute.

Once the message has been modified in this manner, it may be saved at the message store and/or the electronic device 100 for later retrieval. The message as modified can then be rendered by the layout engine 157 as usual, and displayed. FIG. 8 illustrates the possible result of this process. Message display 800 again shows the message inbox 810, header display region 820 and message body display region 830; however, as can be seen by comparison with FIG. 4, the text of the message 831, 832, 833, 834, 836, 835 has increased in size. However, since the formatting directives in the email message were only modified, and not removed as for plain text, the other text formatting remains unchanged: there still remains the heavier-weight, italicized text 832, underlined text 833, different font face 834, and unordered list 836. It may also be noted that the displayed message still includes different font sizes 831, 832 and 835; while all are larger than their corresponding text in FIG. 4, they are still relatively proportional to each other, in that text 835 is smaller than text 831 just as text 435 is smaller than text 431.

Figure 9:
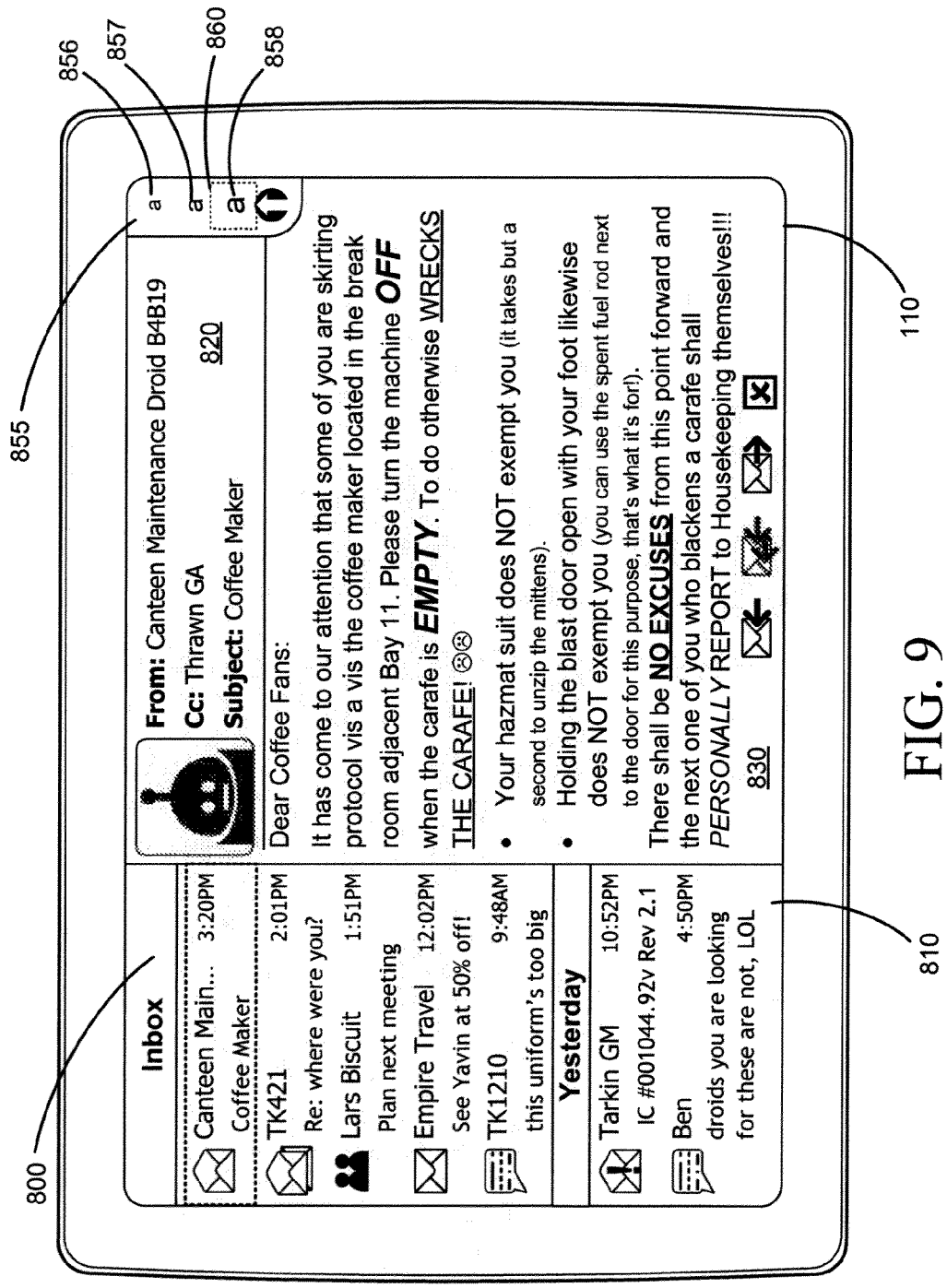
FIG. 9 is an illustration of a further view of the message display screen of FIG. 8 with a further user interface displayed.

Since the email message has been converted to a document with fonts expressed in relative sizes, it is now possible for the messaging client or other user agent to resize the text of the displayed message on the fly, while maintaining the relative sizes of the text (e.g., the relative sizes of text 831, 832, 835). In response to actuation of the user interface element 850 by swiping or double-tapping, a font size selection interface 855 is displayed, as shown in FIG. 9. The font size selection interface 844 includes icons representing a series of possible font sizes, such as smaller 856, normal 857, and larger 858. These possible font sizes may be associated with an increment (e.g., plus or minus 4px), or with a defined font size value (e.g., 14px or 22px). Upon selection of one of these font sizes—in this case, the larger font size 858, as indicated by highlight box 860—an instruction to modify the base font for the document, thus overriding the previously set base font, is executed.

While the HTML version of the email is displayed (as in FIG. 8 or 9), a script (e.g. JavaScript) is executed to modify the DOM body element's font size, which had previously been defined by the inserted <style> declaration. For example:

```
if( document.body ) {
    document.body.style.fontSize = newBaseFontSize;
}
```

Figure 10:
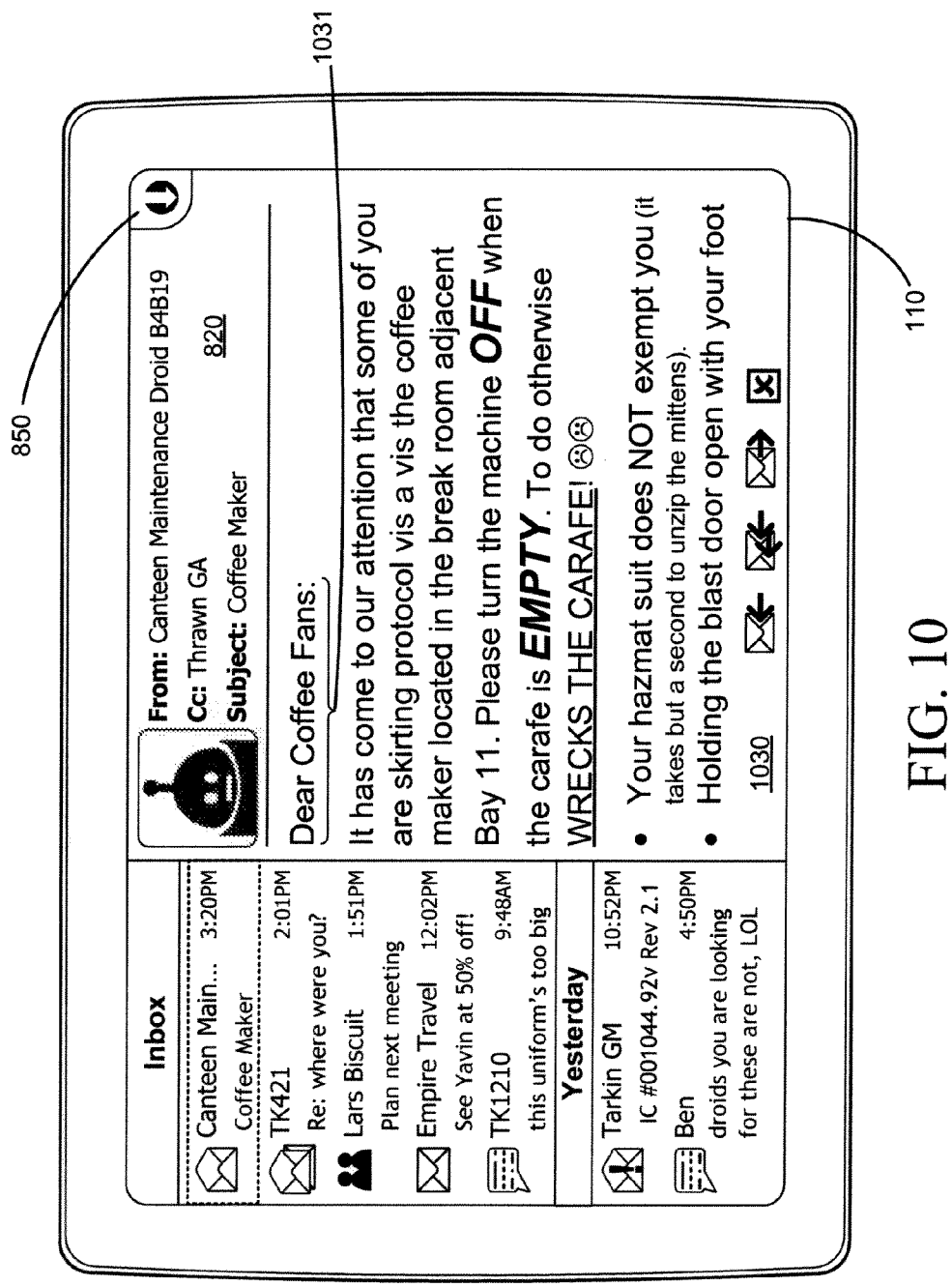
FIG. 10 is an illustration of a still further view of the message display screen of FIG. 8 after applying a further change to the message attribute.

The newly defined newBaseFontSize, set in response to the selection of a new base font size in the user interface element 855, is thus applied to the font size in the body of the email message, and the message is re-rendered and re-displayed as necessary. The end result of the font size selection is shown in FIG. 10, where the text of the message displayed in the message body display region 830 has now increased in size, as can be seen from a comparison of text 1031 to text 831.

The font size selection user interface 855 may also be used for plain text email that was not modified using the above-described technique. For example, a stylesheet may be defined for application to plain text email messages, including a selection of font face and size. When a selection of a new font size is detected, a script may execute to modify the defined font size accordingly.

Figure 11:
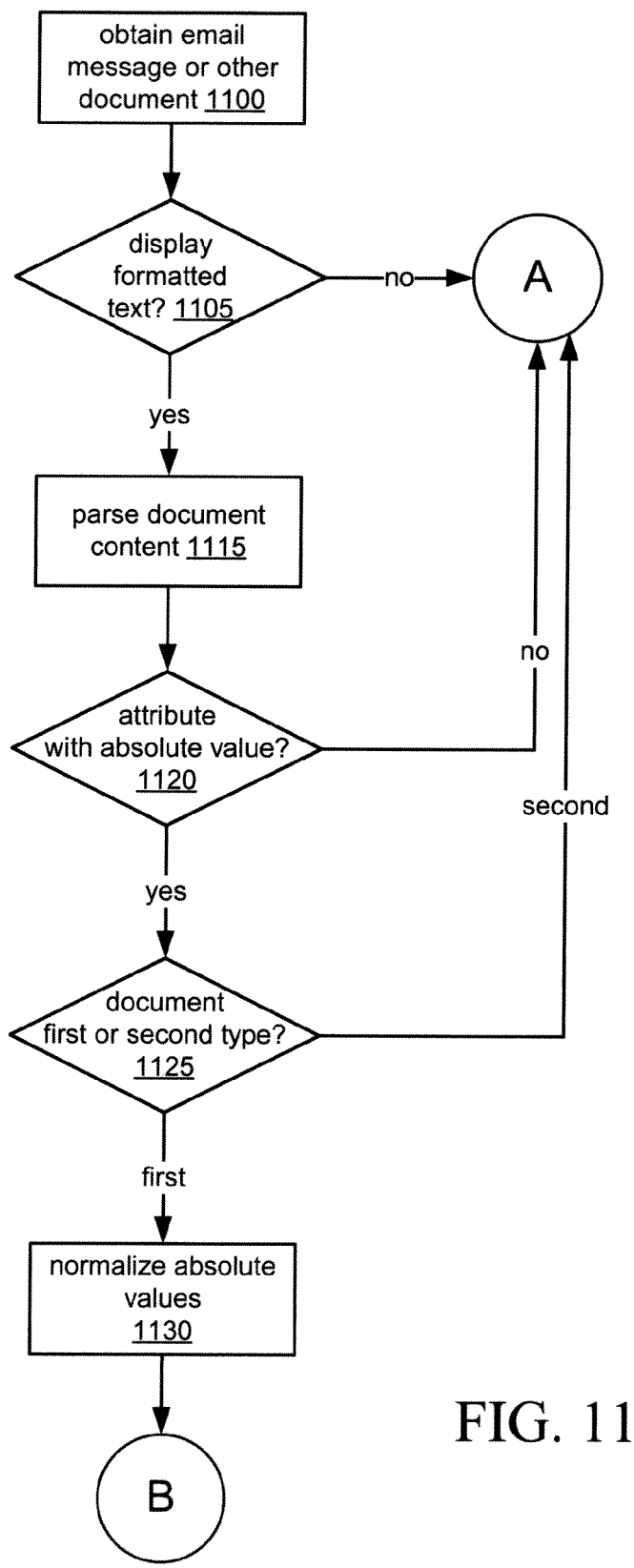
FIG. 11 is a flowchart of a method for normalizing attribute values in a document.

The above-described method for selectively modifying font size is illustrated FIG. 11. At 1100, the email message to be displayed is received, or the other document to be displayed is otherwise obtained. In these embodiments, it is generally contemplated that the message or other document comprises at least one content element, such as text. As mentioned above, this method may be implemented at the message server or at the electronic device 100. Thus, obtaining the email message may include receiving the message from a server, obtaining it from a local store, or obtaining it over a network from a different data store.

At 1105, it may be first determined whether a formatted text version of the message is to be displayed. Since the message may have been received in plain text, or there may not be a formatted version at all, there would be no need to carry out the later determining or modifying steps. If there is no formatted version of the email to be displayed, the process moves to A, which is described with reference to FIG. 12.

If the formatted version of the message is to be displayed, at 1115 the document is parsed and its DOM structure determined, as might be done to prepare an HTML document for display. It is then determined at 1120 whether the message includes any content elements having attributes defined as having an absolute value. Specifically, those attributes that can take on values which reference a size or dimensions of a content element as displayed on a display screen, are identified. Values which reference a size or dimensions of a content element may include font size as expressed in pixels (which are relevant to the ppi of the display screen), in points, and in other physical length units. Those attributes are examined to determine whether they reference absolute values. If there are no absolute values referenced by these attributes, the process again moves to A.

However, if there are such attributes, a determination is next made at 1125 whether the email message is of the first type (which is then modified as necessary) or the second type. If the latter, the process again moves to A. If the email message is of the first type, then the attributes associated with absolute values can be changed to relative values, so at 1130 the absolute values are modified or otherwise normalized. The process then moves to B.

Figure 12:
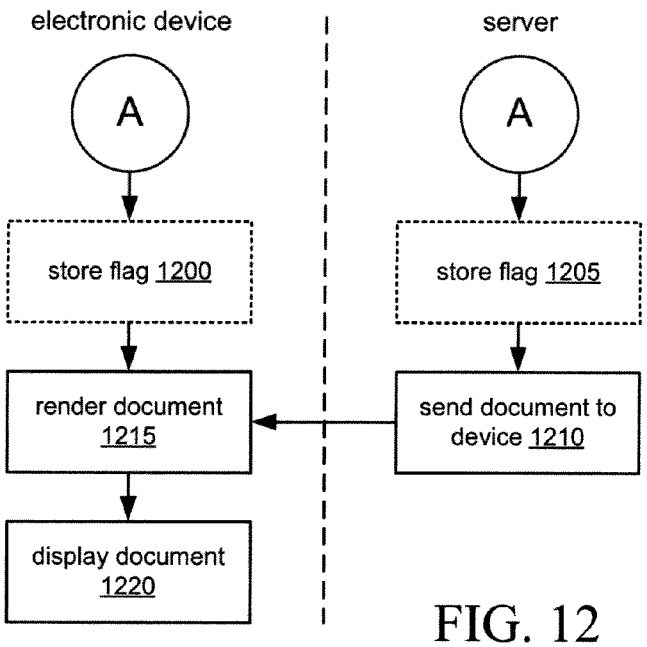
FIGS. 12 and 13 are flowcharts of methods for rendering and displaying a document.

Turning to FIG. 12, the process beginning at A is illustrated. Whether the method takes place at the electronic device 100 or server 250, 260, the device may optionally store a flag or other field value with the email message indicating that the message has already been checked to determine whether it is a first or second type of message at 1200, 1205. When the message is later retrieved, the client or server does not need to redetermine whether the message is of the first or second type, if the field value is included. Next, at 1210, the server sends the email message or other document to the electronic device 100. At 1215, the electronic device renders the document, and displays it at 1220.

Figure 13:
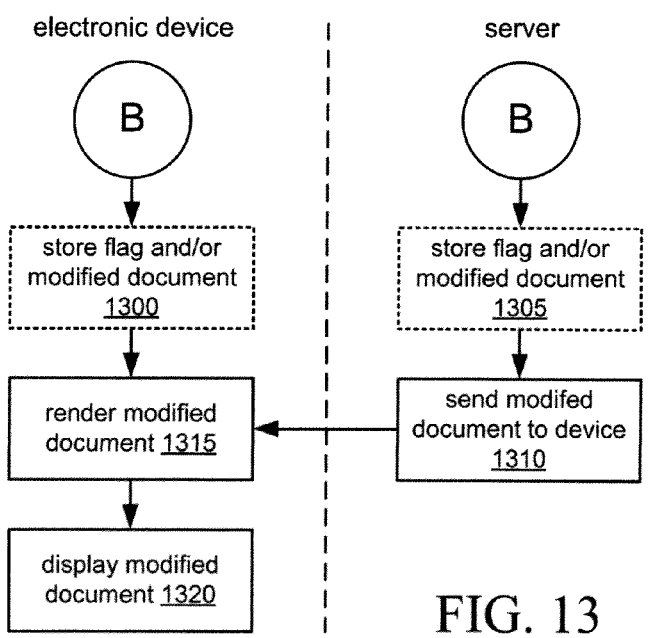

If the email message was modified at 1130, then the process moves to B in FIG. 13. Again, at 1300, 1305 either the server or electronic device may store a flag or field value indicating that the document is of the first type, and may also store the email message as modified, either overwriting the original message, or in addition to the original message. If the modified message is stored at the server, then it may be served to other electronic devices 100' without requiring further modification. Next, the server sends the modified message to the electronic device 100, if necessary at 1310, and at 1315 the electronic device 100 renders the modified email message for display. Finally, at 1320, the rendered message is displayed.

Figure 14:
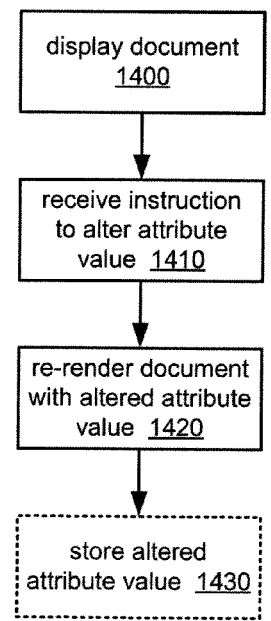
FIG. 14 is a flowchart of a method of altering a document attribute.

FIG. 14 briefly illustrates a method for altering the base font size value once the modified message is displayed. At 1400, the document is displayed. At 1410, an instruction is received to alter the base value associated with the font size attribute for the document, which is then executed. At 1420, the message is re-rendered for display with the base value thus altered. Optionally, the altered base value is stored with the message, so that the next time the message is rendered for display, the new base value for the font size is preserved.

Thus, the method described above selectively converts font sizes from absolute values to relative values, preserving the original design and layout of professionally-crafted messages and messages with multiple nested elements, while rendering merely "communicative" email messages accessible and adaptable to font resizing.

It will be appreciated that the foregoing embodiments potentially reduce the amount of data transferred between an electronic device 100 and the message server. In those cases where an email message is received by the message server in a multipart form with HTML and plain text message parts, the message server may be configured to automatically provide only the HTML portion of the message body to the electronic device 100 when the message is first "pushed" to the electronic device 100, or requested by the electronic device 100 from the server. Without the implementation of the foregoing method, if the HTML version of the message contained absolute font sizes that were displayed at too small a size for the user to comfortably read, the user might have to manually request that the plaintext portion be sent to the electronic device, with the consequential increase in data transfer, as well as delay before the user is able to read the message content. However, with the foregoing method, those "communicative" or casual messages may be converted to relative font sizes without requiring the manual intervention of the user, thus providing the user with a benefit of the plain text message version (i.e., application of a default font size) without having to download the plain text content, and also without loss of other formatting directives intended to be applied to the message content, since all formatting directives in the HTML version are preserved. At the same time, the layout of more professional or complex messages is preserved, which likewise maintains their legibility, since it is more likely that resizing their text would result in a confusing change to the message's appearance. Indeed, it will also be appreciated by those skilled in the art that it is not necessary for the sending messaging client or server to construct a multipart message for receipt by the receiving electronic device 100 or associated message server in order to provide a plaintext version of the message to improve accessibility or legibility at the recipient electronic device 100; the recipient electronic device 100, following the examples set out above, can selectively alter the attributes of the received message without the need for a plaintext version of the message.

There is thus provided a method of presenting a document for display, the method comprising: obtaining a document for display at an electronic device, the document including a content element having an attribute, the attribute being defined in either a body or a header of the document by an associated formatting directive comprising an absolute value referencing a physical characteristic of a display screen; determining that the attribute can be changed for that document based on a presence or absence of an indicator derived from at least one of the body and header; altering the formatting directive to refer to a relative value corresponding to the absolute value, the relative value referencing a base value for the attribute; and rendering the document for display at the electronic device using the formatting directive thus altered.

In one aspect, the document includes a plurality of content elements each having the attribute, each of the attributes being defined by a corresponding associated formatting directive comprising an absolute value referencing the physical characteristic of the display screen, the absolute values for each of the plurality of content elements being different, such that: altering the formatting directive comprises altering each of the formatting directives to refer to a corresponding relative value, each of the relative values referencing the same base value, the relative values for each of the plurality of content elements being different; and rendering the document for display comprises using each of the formatting directives thus altered.

In another aspect, determining that the attribute can be changed for that document comprises: initially determining that the document is of a first type for which the attribute can be changed; and if the indicator is found, determining that the document is of a second type for which the attribute will not be changed.

In still another aspect, the indicator comprises one or more of: presence of an alternative text caption for an image in the document; presence of map elements in the document; the document having at least a threshold number of structural elements in the document body; presence of a table structure in the document; and a domain of a sender of the document not matching a domain of the recipient of the document.

In yet another aspect, the indicator comprises the document having less than a threshold number of structural elements in the document body, and presence of the indicator determines that the attribute can be changed for that document.

In a further aspect, the method further comprises: displaying the document thus rendered; in response to a detected instruction, altering the base value for the attribute for that document; and re-rendering the document for display using the formatting directives and the corresponding relative values.

Still further, the method further comprises storing the base value thus altered in association with that document; also, the content element may comprise text content, and the attribute is a font size for the text content. Still further, the formatting directive associated with the font size is altered, while other formatting directives associated with other attributes of the same text content are unaltered. Still further, the absolute value is a length measurement, and more particularly a font size value expressed in pixels, points or picas. The physical characteristic of the display screen may be either a resolution or pixel density of the display screen, or a length or width of the display screen. The document may comprise an email message or an HTML document, such as a webpage.

In another aspect, when the email message is a multipart message, a first part of the multipart message representing HTML-formatted content comprising the content element having the attribute, and a second part of the multipart message representing a plaintext version of the HTML-formatted content, obtaining the document comprises receiving the first part of the multipart message and not the second part from a message server.

There is also provided an electronic device, which can include components such as a processor and display interface, and may be an electronic device such as those described above, adapted to implement any of the foregoing examples. In some examples, some functions are implemented by a client electronic device while others are implemented by a server.

There is also provided a computer or electronic device-readable medium, which may be non-transitory or physical, and further which may be provided in a computer or electronic device program product, comprising or storing code which, when executed by the one or more processors of a suitable device causes said device to implement the foregoing examples.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method comprising:
   obtaining a document for display at an electronic device, the document comprising a text content element having a font size specified in absolute value by an associated formatting directive, the font size being defined in either a body or a header of the document, and wherein the document comprises an email message;
   determining a count of a number of structural elements in a Document Object Model (DOM) tree structure of the document;
   determining that the document has a simple content layout structure based on detecting one or more indicators in the body or the header of the document, wherein one of the indicators indicates that the count of the number of structural elements in the DOM tree structure of the document is less than a threshold number;
   in response to determining that the document has a simple content layout structure, converting the formatting directive from an absolute value to a corresponding relative value, the relative value referencing a base value for the font size defined for the electronic device; and
   rendering the document for display at the electronic device using the formatting directive thus converted.

2. The method of claim 1, wherein the document includes a plurality of text content elements each having a respective font size specified in absolute value by an associated formatting directive, the absolute values for each of the plurality of text content elements being different, wherein:
   converting the formatting directive comprises converting each of the formatting directives from an absolute value to a corresponding relative value, each of the relative values referencing the same base value, the relative values for each of the plurality of text content elements being different; and
   rendering the document for display comprises using each of the formatting directives thus converted.

3. The method of claim 1, further comprising:
   displaying the document thus rendered;
   detecting an instruction to alter the base value for the font size for the document;

in response to the detected instruction, altering the base value and re-rendering the document for display using the formatting directives and the corresponding relative values.

4. The method of claim 1, wherein the formatting directive associated with the font size is altered, while other formatting directives associated with other attributes of the same text content element are unaltered.

5. The method of claim 1, wherein the absolute value is a font size value expressed in pixels, points or picas.

6. The method of claim 1, wherein the email message is a multipart message, a first part of the multipart message representing HTML-formatted content comprising the text content element having the specified font size, and a second part of the multipart message representing a plaintext version of the HTML-formatted content, wherein obtaining the document comprises receiving the first part of the multipart message and not the second part from a message server.

7. The method of claim 1, wherein the determining and converting are carried out at a server in communication with the electronic device, and the server transmits the document comprising the converted formatting directive to the electronic device.

8. The method of claim 1, wherein the one or more indicators indicate one or more of:
presence of an alternative text caption for an image in the document; and
presence of map elements in the document.

9. The method of claim 1, wherein the one or more indicators indicate presence of nested table structures in the document.

10. The method of claim 1, wherein the one or more indicators indicate that a sender of the email message is a known contact of a recipient.

11. The method of claim 1, wherein the one or more indicators indicate that the email message is addressed to one or more carbon copy (CC) recipients.

12. An electronic device, comprising:
a display interface; and
a processor in communication with the display interface, the processor being configured to:
obtain a document for display at an electronic device, the document comprising a text content element having a font size specified in absolute value by an associated formatting directive, the font size being defined in either a body or a header of the document, and wherein the document comprises an email message;
determine a count of a number of structural elements in a Document Object Model (DOM) tree structure of the document;
determine that the document has a simple content layout structure based on detecting one or more indicators in the body or the header of the document, wherein one of the indicators indicates that the count of the number of structural elements in the DOM tree structure of the document is less than a threshold number;
in response to determining that the document has a simple content layout structure, convert the formatting directive from an absolute value to a corresponding relative value, the relative value referencing a base value for the font size defined for the electronic device; and
render the document for display for the display screen using the formatting directive thus converted.

13. The electronic device of claim 12, wherein the document includes a plurality of text content elements each having a respective font size specified in absolute value by an associated formatting directive, the absolute values for each of the plurality of text content elements being different, wherein:
converting the formatting directive comprises converting each of the formatting directives from an absolute value to a corresponding relative value, each of the relative values referencing the same base value, the relative values for each of the plurality of text content elements being different; and
rendering the document for display comprises using each of the formatting directives thus converted.

14. A non-transitory electronic device-readable medium bearing code which, when executed by a processor of an electronic device, causes the electronic device to carry out the method of:
obtaining a document for display at an electronic device, the document comprising a text content element having a font size specified in absolute value by an associated formatting directive, the font size being defined in either a body or a header of the document, and wherein the document comprises an email message;
determining a count of a number of structural elements in a Document Object Model (DOM) tree structure of the document;
determining that the document has a simple content layout structure based on detecting one or more indicators in the body or the header of the document, wherein one of the indicators indicates that the count of the number of structural elements in the DOM tree structure of the document is less than a threshold number;
in response to determining that the document has a simple content layout structure, converting the formatting directive from an absolute value to a corresponding relative value, the relative value referencing a base value for the font size defined for the electronic device; and
rendering the document for display for the display screen using the formatting directive thus converted.

15. The non-transitory electronic device-readable medium of claim 14, wherein the document includes a plurality of text content elements each having a respective font size specified in absolute value by an associated formatting directive, the absolute values for each of the plurality of text content elements being different, wherein:
converting the formatting directive comprises converting each of the formatting directives from an absolute value to a corresponding relative value, each of the relative values referencing the same base value, the relative values for each of the plurality of content elements being different; and
rendering the document for display comprises using each of the formatting directives thus converted.

16. The non-transitory electronic device-readable medium of claim 14, wherein the method further comprises:
displaying the document thus rendered;
detecting an instruction to alter the base value for the font size for the document;
in response to the detected instruction, altering the base value and re-rendering the document for display using the formatting directives and the corresponding relative values.

17. The non-transitory electronic device-readable medium of claim 14, wherein the absolute value is a font size value expressed in pixels, points or picas.

* * * * *